US012566312B2

(12) United States Patent
Zhang et al.

(10) Patent No.: US 12,566,312 B2
(45) Date of Patent: Mar. 3, 2026

(54) IMAGING ASSEMBLY, ILLUMINATION AND PROJECTION APPARATUS, AND COURTESY LAMP

(71) Applicant: HUIZHOU STAR POLY YU INTELLIGENT TECHNOLOLGY CO., LTD., Huizhou (CN)

(72) Inventors: Xingxu Zhang, Huizhou (CN); Yi Sun, Huizhou (CN); Chen Tu, Huizhou (CN); Qinghong Ma, Huizhou (CN); Jianfeng Yang, Huizhou (CN)

(73) Assignee: HUIZHOU STAR POLY YU INTELLIGENT TECHNOLOGY CO., LTD., Huizhou (CN)

( * ) Notice: Subject to any disclaimer, the term of this patent is extended or adjusted under 35 U.S.C. 154(b) by 540 days.

(21) Appl. No.: 18/058,776

(22) Filed: Nov. 25, 2022

(65) Prior Publication Data

US 2023/0168465 A1    Jun. 1, 2023

(30) Foreign Application Priority Data

Nov. 26, 2021    (CN) .......................... 202111424797.4
Dec. 15, 2021    (CN) .......................... 202111538729.0

(51) Int. Cl.
| | |
|---|---|
| *G02B 9/12* | (2006.01) |
| *F21V 5/00* | (2018.01) |
| *G02B 7/02* | (2021.01) |
| *G02B 9/60* | (2006.01) |
| *G02B 13/18* | (2006.01) |
| *G02B 13/16* | (2006.01) |

(52) U.S. Cl.
CPC ................ *G02B 9/12* (2013.01); *F21V 5/008* (2013.01); *G02B 7/021* (2013.01); *G02B 9/60* (2013.01); *G02B 13/18* (2013.01); *G02B 13/16* (2013.01)

(58) Field of Classification Search
None
See application file for complete search history.

(56) References Cited

U.S. PATENT DOCUMENTS

| | | | | | |
|---|---|---|---|---|---|
| 7,307,799 | B2 * | 12/2007 | Minefuji | ............ | G02B 13/0035 |
| | | | | | 359/716 |
| 8,649,114 | B2 * | 2/2014 | Tsai | ................... | G02B 13/0035 |
| | | | | | 359/716 |

(Continued)

*Primary Examiner* — Darryl J Collins
(74) *Attorney, Agent, or Firm* — Andrew C. Cheng

(57)    ABSTRACT

An imaging assembly includes a first lens, a second lens, and a third lens. The imaging assembly satisfies the following relational expressions: $0.9 < |f2/f| < 2.4$ and $0.23 < \Phi 11/TTL < 0.45$. The illumination and projection apparatus includes the imaging assembly, a housing with a light inlet and a light outlet, and an illumination assembly disposed in a first accommodating space of the housing. The imaging assembly is clamped in a second accommodating space of the housing. The imaging assembly blocks the light outlet, and the illumination assembly blocks the light inlet, which improves sealing performance of the illumination and projection apparatus. An aperture of the second accommodating space is smaller than an aperture of a first accommodating space, which facilitates installation of the imaging assembly and the illumination assembly, and improves convenience of installing the illumination and projection apparatus.

15 Claims, 34 Drawing Sheets

(56) References Cited

U.S. PATENT DOCUMENTS

| | | | |
|---|---|---|---|
| 2011/0228157 A1* | 9/2011 | Tang ........................ | G02B 9/12 |
| | | | 359/716 |
| 2014/0184877 A1* | 7/2014 | Ahn ........................ | G02B 9/12 |
| | | | 359/716 |
| 2019/0025600 A1* | 1/2019 | Tang ...................... | G02B 7/021 |
| 2023/0280568 A1* | 9/2023 | Kwon ................ | G02B 13/0065 |
| | | | 359/714 |

* cited by examiner

Percent

Millimeters

Percent

Percent

Field: 23.1770 w 23.1770 h Degrees
Image: 3.06 w 3.06 h Millimeters
Maximum distortion: 0.0718%
Scale: 1.000X, Wavelength: 0.6000 μm

S T

+Y

-0.20                 0.00                 0.20

Millimeters

Percent

Field: 22.3983 w 22.3983 h Degrees
Image: 2.55 w 2.55 h Millimeters
Maximum distortion: 0.2905%
Scale: 1.000X, Wavelength: 0.6000 μm Millimeters Percent Field: 22.3983 w 22.3983 h Degrees
Image: 2.56 w 2.56 h Millimeters
Maximum distortion: -0.3967%
Scale: 1.000X, Wavelength: 0.6000 µm Millimeters

+Y

Percent

Field: 22.3983 w 22.3983 h Degrees
Image: 2.27 w 2.27 h Millimeters
Maximum distortion: -0.4446%
Scale: 1.000X, Wavelength: 0.6000 μm

A-A

1

IMAGING ASSEMBLY, ILLUMINATION AND PROJECTION APPARATUS, AND COURTESY LAMP

FIELD OF TECHNOLOGY

The present disclosure relates to the technical field of optical projection imaging, in particular to an imaging assembly, an illumination and projection apparatus, and a courtesy lamp.

BACKGROUND

A courtesy lamp (also known as a ground lamp or a projection lamp) for auxiliary illumination may be used for ground illumination or route illumination in low ambient light. For example, the courtesy lamp for a car is usually installed at a position such as a car door or a rear-view mirror. When the door is opened, an illumination function will be enabled to project an image on the ground, which not only produces unique dazzling image light and a projected image, but also provides a function of illuminating the ground during door opening in low ambient light at night, such that people who get on or off the car can pay attention to a state of the ground without accidentally stepping on dirt, puddles, or other dangerous terrain of the ground. A conventional courtesy lamp includes an illumination part configured to focus light of a light source and a projection part configured to transmit the light focused by the illumination part.

However, the projection part of the conventional courtesy lamp is a main part with many lenses, such that the courtesy lamp is longer and larger and is inconvenient to disassemble and maintain.

In addition, in a lens module of the conventional courtesy lamp, a plurality of lenses is assembled by using a split housing in general. For example, a peanut shell structure is used, which leads to gaps on the housing of the lens module, such that water in an external environment easily invades the lens module to form water mist on the lenses, resulting in poorer imaging effect of the courtesy lamp.

SUMMARY

To overcome the defects in the prior art and solve the technical problem, the present disclosure provides an imaging assembly, an illumination and projection apparatus, and a courtesy lamp that are effectively reduced in length and improved in both sealing performance and installation convenience.

The objective of the present disclosure is achieved by the following technical solution:

An imaging assembly, along an optical axis and from an image side to an object side, sequentially including:
- a first lens having a negative power;
- a second lens having a negative power, an object side surface of the second lens being a convex surface at the optical axis, an image side surface of the second lens being a concave surface at the optical axis; and
- a third lens having a positive power;
- the imaging assembly satisfying the following relational expressions:

$$0.9<|f2/f|<2.4 \text{ and } 0.23<\Phi11/TTL<0.45;$$

where f2 is a focal length of the second lens, f is a focal length of the imaging assembly, $\Phi11$ is an aperture of

2 an image side surface of the first lens, and TTL is a total length of the imaging assembly.

In one of embodiments, the imaging assembly further satisfies the following relational expression:

$$8 \text{ mm}<TTL<12.1 \text{ mm}.$$

In one of embodiments, the imaging assembly satisfies the following relational expressions:

$$0.17<IH/TTL<0.22;$$

where IH is a maximum image height of a projected image of the imaging assembly.

In one of embodiments, the imaging assembly satisfies the following relational expressions:

$$0.55<CTmax-CTmin<1.8;$$

where CTmax is a maximum thickness of each lens, and CTmin is a minimum thickness of each lens.

In one of embodiments, the imaging assembly satisfies the following relational expressions:

$$-3.8<f1-f<-1.4;$$

where f1 is a focal length of the first lens.

In one of embodiments, the imaging assembly satisfies the following relational expressions:

$$-31<f3-f2<-4.5;$$

where f3 is a focal length of the third lens.

An illumination and projection apparatus, including:
- the imaging assembly described above;
- the imaging assembly described above;
- a housing, the housing having a first accommodating space and a second accommodating space communicating with each other, the housing being further provided with a light inlet and a light outlet, the light inlet correspondingly communicating with the first accommodating space, the light inlet being arranged corresponding to a light source, the light outlet correspondingly communicating with the first accommodating space; and
- an illumination assembly, the illumination assembly being clamped in the first accommodating space, the illumination assembly being configured to focus light of the light source;
- wherein the imaging assembly is clamped in the second accommodating space, the imaging assembly is configured to adjust a visual field angle of light imaging, and an aperture of the second accommodating space is smaller than an aperture of the first accommodating space.

In one of embodiments, an aperture of the light inlet is greater than or equal to the aperture of the first accommodating space.

In one of embodiments, an aperture of the light outlet is smaller than or equal to the aperture of the second accommodating space.

In one of embodiments, the first lens is arranged close to the light outlet, at least one of the first lens and the second lens is provided with a clamping slot, part of at least one of the first lens and the second lens is positioned in the clamping slot, and the third lens is arranged close to the illumination assembly.

In one of embodiments, the imaging assembly further includes a first spacer, the first spacer is positioned between the first lens and the second lens, and the first spacer respectively abuts against the first lens and the second lens.

In one of embodiments, the imaging assembly further includes a second spacer, the second spacer is positioned between the second lens and the third lens, and the second spacer respectively abuts against the second lens and the third lens.

In one of embodiments, the housing includes a housing body and two clamping posts, the two clamping posts are connected to the housing body, the two clamping posts are arranged adjacent to the light inlet, and the two clamping posts are configured to be connected to a lamp bracket.

In one of embodiments, the housing is provided with a directional slot, the directional slot is arranged corresponding to one of the clamping posts, and the directional slot is further configured to receive part of the lamp bracket.

In one of embodiments, the optical axis of the imaging assembly coincides with an optical axis of the illumination assembly, the housing further includes an installation guide convex strip, the installation guide convex strip is connected to the housing body, an extension direction of the installation guide convex strip is parallel to the optical axis of the imaging assembly, and the installation guide convex strip is received in a guide slot on the lamp bracket.

In one of embodiments, the illumination assembly includes a fourth lens and a fifth lens, the fourth lens and the fifth lens are distributed in sequence from an image side to an object side along an optical axis, an object side surface of the fourth lens is a plane at the optical axis, an image side surface of the fourth lens is a convex surface at the optical axis, an object side surface of the fifth lens is a plane at the optical axis, and an image side surface of the fifth lens is a convex surface at the optical axis.

A courtesy lamp, including the illumination and projection apparatus described above.

The present disclosure has the following beneficial effects:

By respectively defining shapes of the image side surface and the object side surface of the second lens to be concave and convex at the optical axis, and according to a relationship between the focal length of the second lens and a focal length of a system, a total optical length of the imaging assembly is effectively controlled, that is to say, the length of the imaging assembly can be reduced while the quality of projection imaging is ensured; and according to a relationship between the aperture of the image side surface of the first lens and a total length of the system, the total optical length of the imaging assembly is effectively reduced to achieve miniaturization of the imaging assembly.

In addition, the imaging assembly blocks the light outlet and the illumination assembly blocks the light inlet to insulate an interior of the housing from an external environment, which improves sealing performance of the illumination and projection apparatus. Moreover, the aperture of the second accommodating space is smaller than the aperture of the first accommodating space, the imaging assembly is installed in the second accommodating space, and the illumination assembly is installed in the first accommodating space, which facilitates sequential installation of the imaging assembly and the illumination assembly, and improves convenience of installing the illumination and projection apparatus.

BRIEF DESCRIPTION OF THE DRAWINGS

To more clearly illustrate the technical solution in the embodiments of the present disclosure, the accompanying drawings that need to be used in the embodiments will be briefly introduced below. It should be understood that the accompanying drawings below merely illustrate some embodiments of the present disclosure and therefore should not be regarded as limiting the scope. Those of ordinary skill in the art may also derive other related accompanying drawings from these accompanying drawings without creative efforts.

Figure 1:
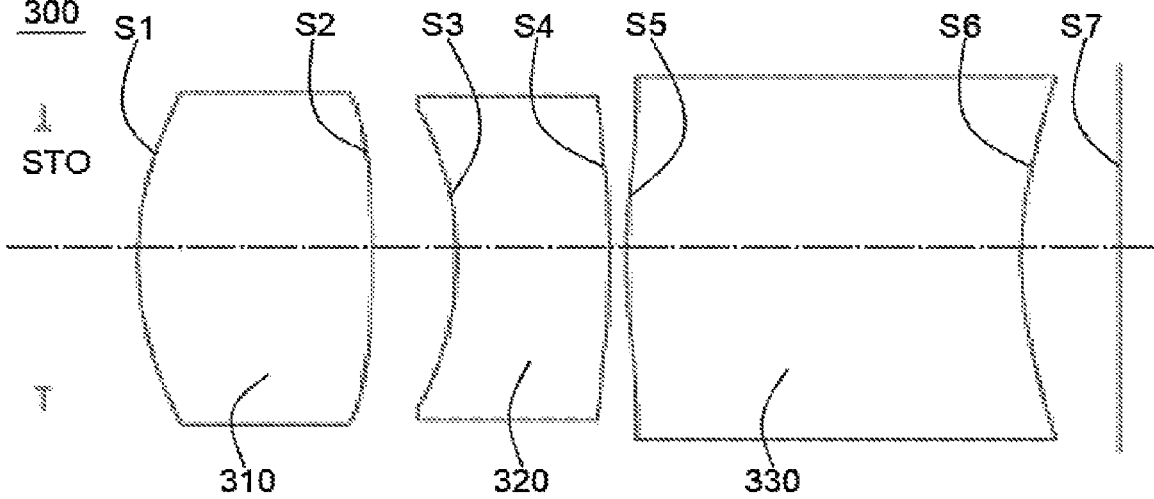
FIG. 1 is a schematic diagram of an imaging assembly according to an embodiment 1 of the present disclosure.

In which:

10: illumination and projection apparatus; 100: housing; 110: housing body; 112: directional slot; 120: clamping post;

130: installation guide convex strip; 140: illumination adhesive dispensing surface; 150: imaging adhesive dispensing surface;

101: accommodating space; 102: first accommodating space; 104: second accommodating space; 106: light inlet; 108: light outlet;

200: illumination assembly; 210: illumination lens; 2101: fourth lens; 2102: fifth lens;

220: film; 230: film installation bracket;

231: first support ring; 232: first accommodating slot; 2321: residue accommodating space; 2322: directional slope;

233: second support ring; 234: through hole; 235: clamping protrusion; 236: second accommodating slot; 2361: avoidance slot;

237: first stabilizing plane; 238: bracket body; 239: residue accommodating ring; 212: second stabilizing plane;

240: stabilizing protrusion;

300: imaging assembly; 310: first lens; 320: second lens; and 330: third lens.

DESCRIPTION OF THE EMBODIMENTS

The technical solution in the embodiments of the present disclosure will be described below with reference to the accompanying drawings.

For the convenience of understanding, the technical terms involved in the present disclosure are first explained and described below.

It should be noted that for the convenience of understanding and description, the embodiments of the present disclosure define representative forms of relevant parameters of an optical lens. For example, TTL is configured for representing a distance between an object side surface of a first lens and an imaging surface of the optical lens on an optical axis; and ImgH represents a maximum image height of the optical lens, and letters with similar definitions are schematic only, of course, they may also be represented in other forms, which are not limited in the present disclosure.

It should also be noted that the units of the parameters involving ratios in the relational expressions below are kept consistent. For example, the unit of numerator is millimeter (mm), and the unit of denominator is millimeter (mm).

It should also be noted that positive or negative of the radius of curvature represents that an optical surface is convex to an object side or an image side. When the optical surface (including the object side surface or the image side surface) is convex to the object side, the radius of curvature of the optical surface is a positive value; and when the optical surface (including the object side surface or the image side surface) is convex to the image side, it is equivalent to that the optical surface is concave to the object side surface, and the radius of curvature of the optical surface is a negative value.

It should also be noted that the shape of the lens and the degree of convexity and concavity of the object side surface and the image side surface in the accompanying drawings are only schematic and do not limit the embodiments of the present disclosure. In the present disclosure, a material of the lens may be resin, plastic, or glass. The lens includes a spherical lens and an aspherical lens. The lens may be a fixed-focus lens or a zoom lens, or may be a standard lens, a short-focus lens, or a long-focus lens.

In this specification, a space on a side where an object is located relative to an optical element is referred to as an object side of the optical element, and correspondingly, a space on a side where an image formed by the object is located relative to the optical element is referred to as an image side of the optical element, A surface closest to the object in each lens is referred to as the object side surface, and a surface closest to the imaging surface in each lens is referred to as the image side surface. The direction from the object side to the image side is defined as a positive direction of the distance.

In addition, in the description below, when the surface of the lens is a convex surface and the position of the convex surface is not defined, it indicates that the surface of the lens is the convex surface at least at the position close to the optical axis; and when the surface of the lens is a concave surface and the position of the concave surface is not defined, it indicates that the surface of the lens is the concave surface at least at the position close to the optical axis. Here, the position close to the optical axis refers to the region near the optical axis.

The features, principle and other aspects of the present disclosure will be described in detail below.

Referring to FIG. 1, it is a schematic structural diagram of an imaging assembly according to an embodiment of the present disclosure. The imaging assembly includes three lenses, namely; a first lens, a second lens, and a third lens. The three lenses are arranged in sequence from an image side to an object side along an optical axis.

By respectively enabling an object side surface and an image side surface of the second lens to be a convex surface and a concave surface at the optical axis, and according to a relationship between a focal length of the second lens and a focal length of a system, a total optical length of the imaging assembly is effectively controlled, that is to say, the length of the imaging assembly can be reduced while the quality of projection imaging is ensured; and according to a relationship between an aperture of an image side surface of the first lens and a total length of the system, the total optical length of the imaging assembly is effectively reduced to achieve miniaturization of the imaging assembly.

In this embodiment, the imaging assembly satisfies the following relational expressions: $0.9<|f2/f|<2.4$ and $0.23<\Phi11/TTL<0.45$; where f2 is the focal length of the second lens, f is a focal length of the imaging assembly, $\Phi11$ is the aperture of the image side surface of the first lens, and TTL is the total length of the imaging assembly. A value of $|f2/f|$ may be 0.958; 1.187, 1.268, 1.578, 1.588, or 2.334, and a value of $\Phi11/TTL$ may be 0.24, 0.25, 0.31, 0.33, 0.37, or 0.42. By respectively defining shapes of the image side surface and the object side surface of the second lens to be concave and convex at the optical axis, and according to a relationship between the focal length of the second lens and the focal length of the system, a total optical length of the imaging assembly is effectively controlled, that is to say; the length of the imaging assembly can be reduced while the quality of projection imaging is ensured; and according to a relationship between the aperture of the image side surface of the first lens and the total length of the system, the total optical length of the imaging assembly is effectively reduced to achieve miniaturization of the imaging assembly.

In one of embodiments, the imaging assembly further satisfies the following relational expression: $8\,mm<TTL<12.1\,mm$. In this embodiment, since the image side surface of the first lens serves as a final transmission surface of the imaging assembly, that is to say, after optical refraction by the third lens and the second lens, light will be projected out from the image side surface of the first lens, a light output range of the image side surface of the first lens can be conveniently adjusted by adjusting the aperture of the image side surface of the first lens, such that on the premise of ensuring the projection imaging quality of the imaging assembly, the total length of the imaging assembly is conveniently controlled to be within a specified length range, that is to say, the total length of the imaging assembly is controlled to be within a range from 8 mm to 12.1 mm, thereby facilitating the miniaturization of the imaging assembly.

In one of embodiments, the imaging assembly satisfies the following relational expressions: $0.17 < IH/TTL < 0.22$; where IH is a maximum image height of a projected image of the imaging assembly. In this embodiment, a value of IH/TTL may be 0.178, 0.189, 0.190, 0.194, 0.212, or 0.216. By respectively enabling an object side surface and an image side surface of the second lens to be a convex surface and a concave surface at the optical axis, and according to a relationship between a focal length of the second lens and the focal length of the system, the total optical length of the imaging assembly is effectively controlled, that is to say, the length of the imaging assembly can be reduced while the quality of projection imaging is ensured; and according to a relationship between an aperture of an image side surface of the first lens and a total length of the system, the total optical length of the imaging assembly is effectively reduced to achieve miniaturization of the imaging assembly. The maximum height of the projected image of the imaging assembly is adjusted and by adjusting a ratio of the maximum image height of the imaging assembly to the total length of the imaging assembly, the total optical length of the imaging assembly may be effectively controlled, that is to say, the ratio of the maximum image height to the total length is controlled to be within a specified range, such that the total length of the lens is effectively reduced while the imaging quality of the imaging assembly is ensured, thereby further facilitating the miniaturization of the imaging assembly.

In one of embodiments, the imaging assembly satisfies the following relational expressions: $0.55 < CTmax - CTmin < 1.8$; where CTmax is a maximum thickness of each lens, and CTmin is a minimum thickness of each lens. In this embodiment, a value of CTmax−CTmin may be 0.550, 0.569, 0.704, 0.782, 0.788, or 1.799. By respectively enabling an object side surface and an image side surface of the second lens to be a convex surface and a concave surface at the optical axis, and according to a relationship between a focal length of the second lens and a focal length of a system, a total optical length of the imaging assembly is effectively controlled, that is to say, the length of the imaging assembly can be reduced while the quality of projection imaging is ensured; and according to a relationship between an aperture of an image side surface of the first lens and a total length of the system, the total optical length of the imaging assembly is effectively reduced to achieve miniaturization of the imaging assembly. By comparing a difference value between the lens thicknesses of each lens, that is to say, by calculating the difference value between the maximum thickness and the minimum thickness of each lens, a spatial range of each lens is conveniently controlled, such that the length of the imaging assembly is conveniently controlled to make an overall mechanical structure of the imaging assembly more uniform and reduce a reliability risk caused by the uneven lens thickness, and it is convenient to further reduce the total length of the imaging assembly while ensuring the quality of projection imaging, thereby further facilitating the miniaturization of the imaging assembly.

In one of embodiments, the imaging assembly satisfies the following relational expressions: $-3.8 < f1 - f < -1.4$; where f1 is a focal length of the first lens. In this embodiment, a value of f1−f may be −3.734, −2.890, −2.010, −1.972, −1.588, or −1.442. By respectively enabling an object side surface and an image side surface of the second lens to be a convex surface and a concave surface at the optical axis, and according to a relationship between a focal length of the second lens and a focal length of a system, a total optical length of the imaging assembly is effectively controlled, that is to say, the length of the imaging assembly can be reduced while the quality of projection imaging is ensured; and according to a relationship between an aperture of an image side surface of the first lens and a total length of the system, the total optical length of the imaging assembly is effectively reduced to achieve miniaturization of the imaging assembly. By controlling the focal length of the first lens and the total focal length of the imaging assembly, that is to say, by determining a difference value between the focal length of the first lens and the total focal length, it is convenient to determine a deviation between the focal length of the first lens and the total focal length, such that it is convenient to determine that the focal length of the first lens can ensure the quality of projection imaging. After all, the first lens serves as a final lens for projection imaging. After the difference value between the focal length of the first lens and the total focal length is adjusted, the total length of the imaging assembly is controlled by reducing the difference between the focal length of the first lens and the total focal length, thereby further facilitating the miniaturization of the imaging assembly.

In one of embodiments, the imaging assembly satisfies the following relational expressions: $-31 < f3 - f2 < -4.5$; where f3 is a focal length of the third lens. In this embodiment, a value of f3−f2 may be −30.799, −24.867, −19.948, −15.310, −6.168, or −4.822. By respectively enabling an object side surface and an image side surface of the second lens to be a convex surface and a concave surface at the optical axis, and according to a relationship between a focal length of the second lens and a focal length of a system, a total optical length of the imaging assembly is effectively controlled, that is to say, the length of the imaging assembly can be reduced while the quality of projection imaging is ensured; and according to a relationship between an aperture of an image side surface of the first lens and a total length of the system, the total optical length of the imaging assembly is effectively reduced to achieve miniaturization of the imaging assembly. By increasing a focal length difference between the second lens and the third lens, a spacing between the second lens and the third lens is conveniently adjusted to effectively control a transmission angle of the light and change and optimize a direction of the light, thereby effectively improving the image resolution capability and chromatic aberration control capability of the imaging assembly.

In another embodiment, the material of each lens is the plastic, which avoids great difficulty in processing, high cost, large distortion, and heavy weight caused by use of the lens made of the glass, effectively reduces the total length of the imaging assembly, and reduces the overall size of the imaging assembly, thereby further facilitating the miniaturization of the imaging assembly.

Specific embodiments of the imaging assembly applicable to the above embodiments are further described below with reference to the accompanying drawings.

For the convenience of description, in the embodiments below, STO represents a surface of a diaphragm, S1 represents the image side surface of the first lens 310, S2 represents an object side surface of the first lens 310, S3 represents the image side surface of the second lens 320, S4 represents the object side surface of the second lens 320, S5 represents an image side surface of the third lens 330, S6 represents an object side surface of the third lens 330, and S7 represents the imaging surface.

Embodiment 1

The imaging assembly according to Embodiment 1 of the present disclosure is described below with reference to FIG. 1 to FIG. 2F. A dashed and dotted line in FIG. 1 represents the optical axis of the imaging assembly.

FIG. 1 shows the schematic structural diagram of the imaging assembly according to Embodiment 1. As shown in FIG. 1, the imaging assembly includes the diaphragm STO, the first lens 310, the second lens 320, and the third lens 330 in sequence from the image side to the object side along the optical axis. The diaphragm (STO) is positioned on the image side of the first lens 310.

The first lens 310 has a negative power, and both the image side surface S1 and the object side surface S2 thereof are aspheiical surfaces. Moreover, the image side surface S1 of the first lens 310 is a convex surface at the optical axis and is a convex surface at the circumference, and the object side surface S2 of the first lens 310 is a convex surface at the optical axis and is a convex surface at the circumference.

The second lens 320 has a negative power, and both the image side surface S3 and the object side surface S4 thereof are aspherical surfaces. Moreover, the image side surface S3 of the second lens 320 is a concave surface at the optical axis and is a convex surface at the circumference, and the object side surface S4 of the second lens 320 is a convex surface at the optical axis and is a convex surface at the circumference.

The third lens 330 has a positive power, and both the image side surface S5 and the object side surface S6 thereof are aspherical surfaces. Moreover, the image side surface S5 of the third lens 330 is a convex surface at the optical axis and is a concave surface at the circumference, and the object side surface S6 of the third lens 330 is a concave surface at the optical axis and is a convex surface at the circumference.

The diaphragm STO is positioned on the image side of the first lens 310 to further improve the brightness of the image of the imaging assembly, thereby improving the imaging definition of the imaging assembly.

Table 1 shows a surface type, a radius of curvature, a thickness, a refractive index, and a conic of each lens of the imaging assembly according to Embodiment 1, where the total length, the radius of curvature, and the thickness of the imaging assembly are all in millimeters (mm).

TABLE 1

| EFL = 5.50561 mm | | FOV = 15.642° | | TTL = 8.001 mm | |
|---|---|---|---|---|---|
| Surface number | Surface type | Radius of curvature | Thickness | Refractive index of material | Fno = 2.643 Conic |
| OBJ | Spherical surface | Infinity | 1000 | | |
| STO | Spherical surface | Infinity | 0.7000 | | |
| S1 | Aspherical surface | 2.7229 | 1.7456 | 1.57 | −0.3135 |
| S2 | Aspherical surface | −9.3589 | 0.6285 | | 17.3874 |
| S3 | Aspherical surface | −2.4769 | 1.1349 | 1.65 | −5.8308 |
| S4 | Aspherical surface | −6.4447 | 0.1270 | | −60.3008 |
| S5 | Aspherical surface | 5.1679 | 2.9337 | 1.50 | −12.6763 |
| S6 | Aspherical surface | 3.2903 | 0.7314 | | 2.2332 |
| S7 | Spherical surface | Infinity | — | | |

It may be seen from Table 1 that in this embodiment, the first lens 310 to the third lens 330 are all plastic aspherical lenses, and each aspherical surface type x is defined by the following formula:

$$x = \frac{ch^2}{1 + \sqrt{1 - (k+1)c^2h^2}} + \sum A_i h^i;$$

where x is a vector height of a distance between a position of the aspherical surface at a height h along the optical axis and a vertex of the aspherical surface; c is a paraxial curvature of the aspthetical surface, and c=1/R (that is to say, the paraxial curvature c is a reciprocal of the radius R of curvature in Table 1); k is the conic; and Ai is the $i^{th}$-order coefficient of the aspherical surface. Table 2 below shows high-order coefficients A4, A6, A8, A10, and A12 that may be used for the aspherical surfaces S1 to S6 of the lenses in Embodiment 1.

It should be understood that the aspherical surface of each lens in the imaging assembly 300 may be the aspherical surface shown in the above aspherical surface formula or other aspherical surface formula, which is not limited in the present disclosure.

TABLE 2

| Surface number | A4 | A6 | A8 | A10 | A12 |
|---|---|---|---|---|---|
| S1 | −6.7358370E−04 | −1.0972788E−03 | −3.3863085E−04 | −2.4175251E−04 | 5.4674112E−07 |
| S2 | −1.7691347E−03 | −5.6913754E−03 | −2.5186933E−03 | −7.6674992E−04 | 5.2872316E−04 |
| S3 | −7.4548928E−03 | −5.6815393E−03 | −3.3374164E−03 | −1.9015417E−03 | 5.4831838E−04 |

TABLE 2-continued

| Surface number | A4 | A6 | A8 | A10 | A12 |
|---|---|---|---|---|---|
| S4 | −4.8326658E−03 | 5.2294509E−03 | −7.4146507E−04 | 2.0098882E−04 | −3.1067586E−04 |
| S5 | −1.9496813E−02 | −4.3299972E−03 | 2.5235424E−03 | −2.4421976E−04 | −1.2520138E−04 |
| S6 | −2.8150134E−02 | −2.2611956E−03 | 2.6565483E−03 | −1.8417215E−03 | 3.0399723E−04 |

It may be seen that in combination with the data in Table 1 and Table 2, the imaging assembly in Embodiment 1 satisfies the following relational expressions:

$|f2/f|=1.268$, where f2 is the focal length of the second lens, and f is the focal length of the imaging assembly.

$\Phi11/TTL=0.335$, where $\Phi11$ is the aperture of the image side surface of the first lens, and TTL is the total length of the imaging assembly.

$IH/TTL=0.194$, where IH is the maximum image height of the projected image of the imaging assembly.

$CTmax-CTmin=1.799$, where CTmax is the maximum thickness of each lens, and CTmin is the minimum thickness of each lens.

$f1-f=-1.588$, where f1 is the focal length of the first lens.

$f3-f2=-30.799$, where f3 is the focal length of the third lens.

Figure 2A:
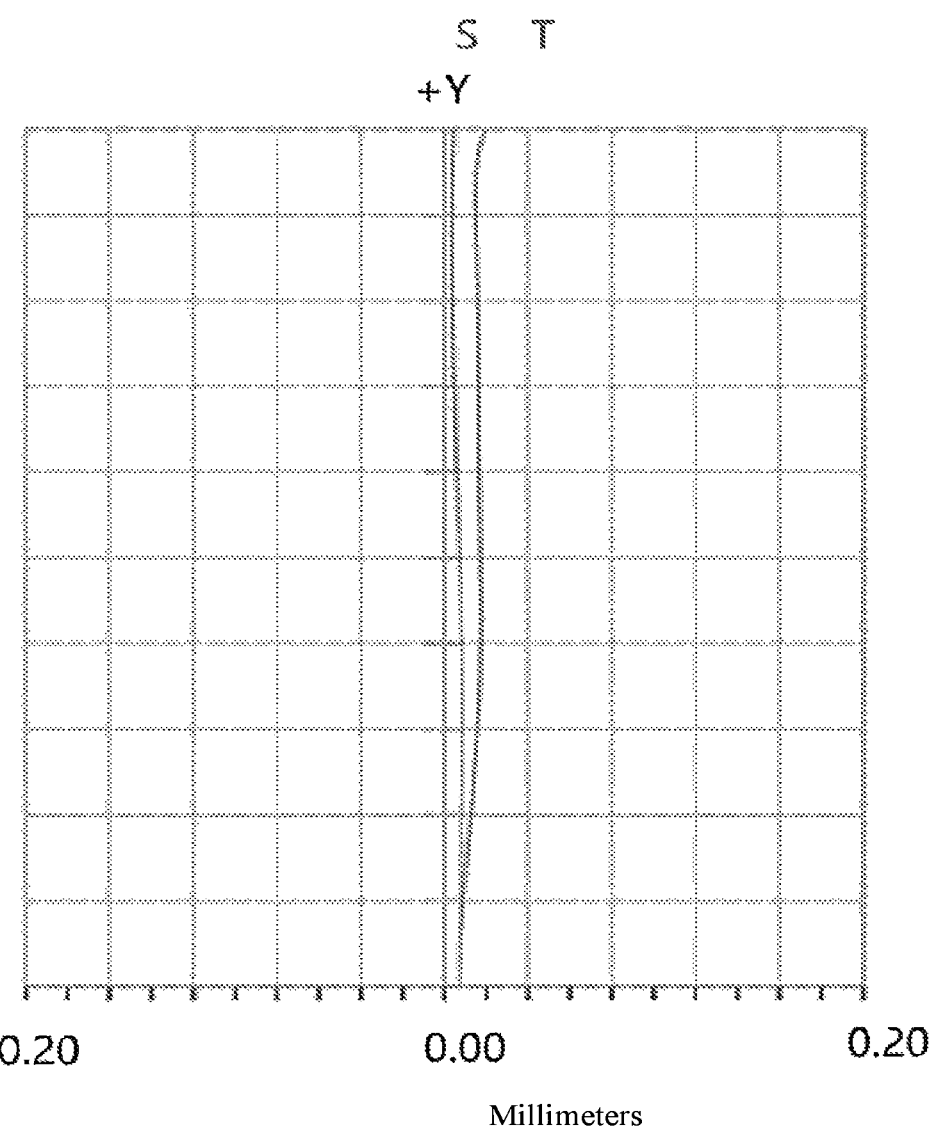
FIG. 2A to FIG. 2F are respectively an astigmatic curve, a distortion curve graph, a grid distortion graph, a modulation transfer function (MTF) curve graph, a relative illumination graph, and a projection imaging graph of the imaging assembly according to the embodiment 1.
Figure 2B:
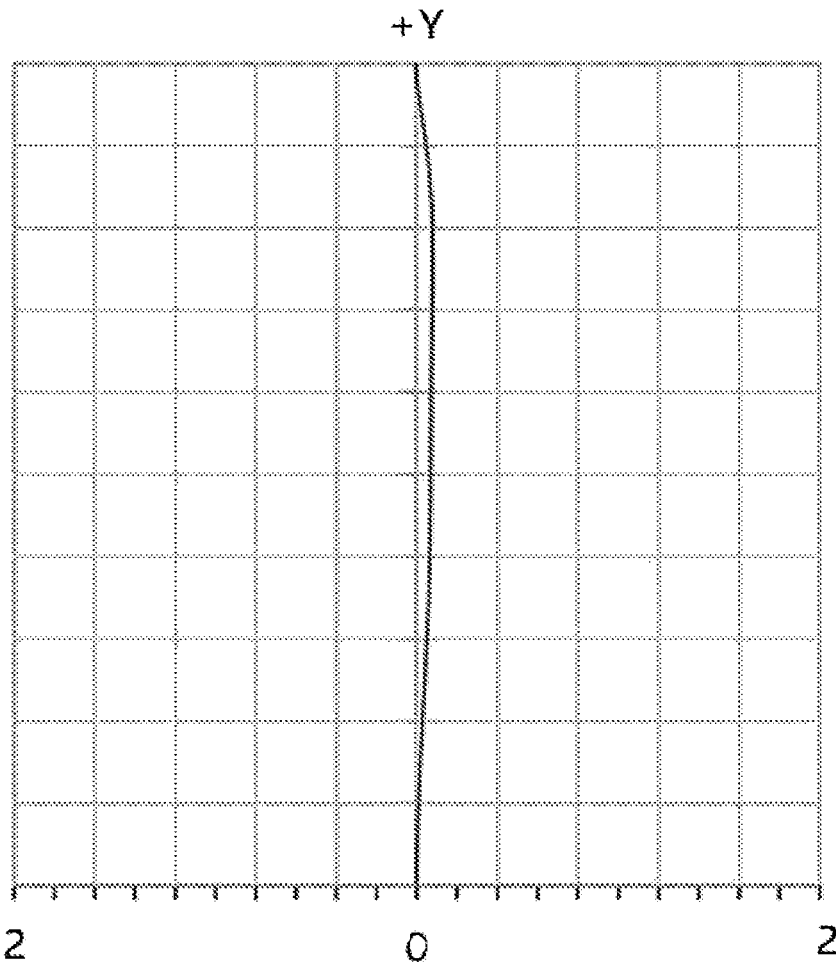
Figure 2C:
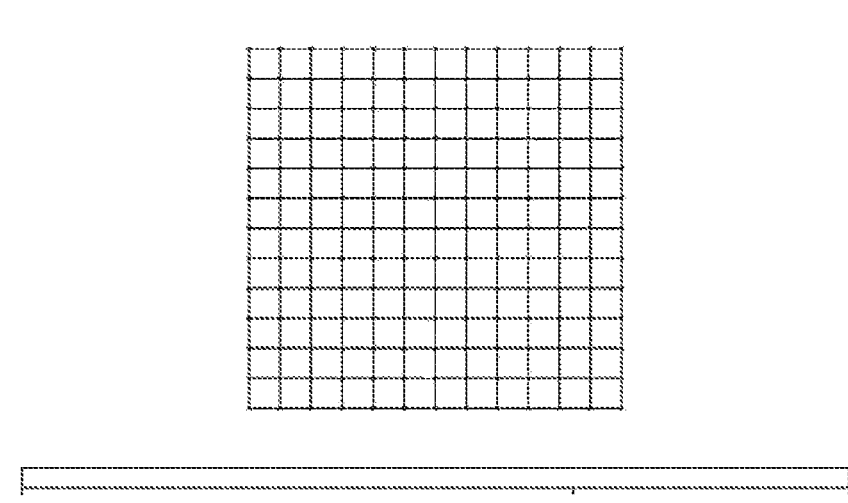
Figure 2D:
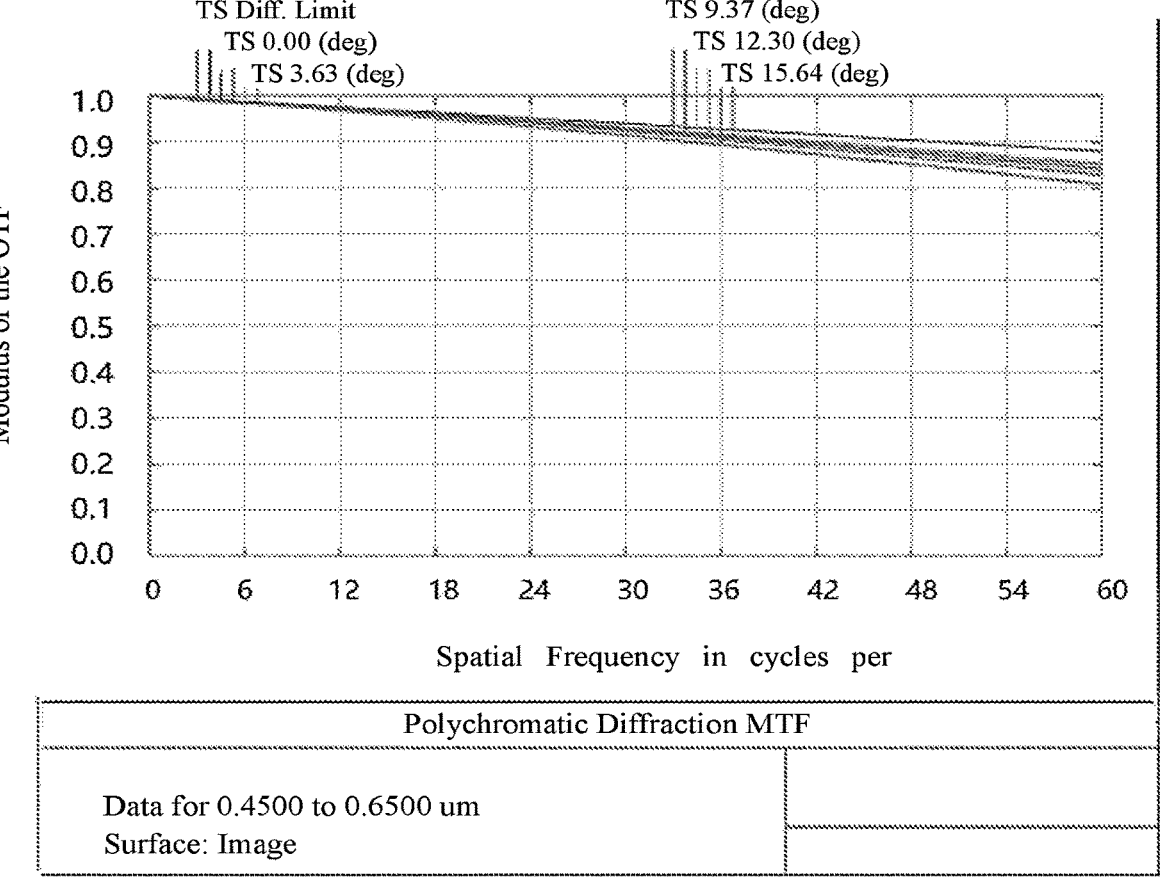
Figure 2E:
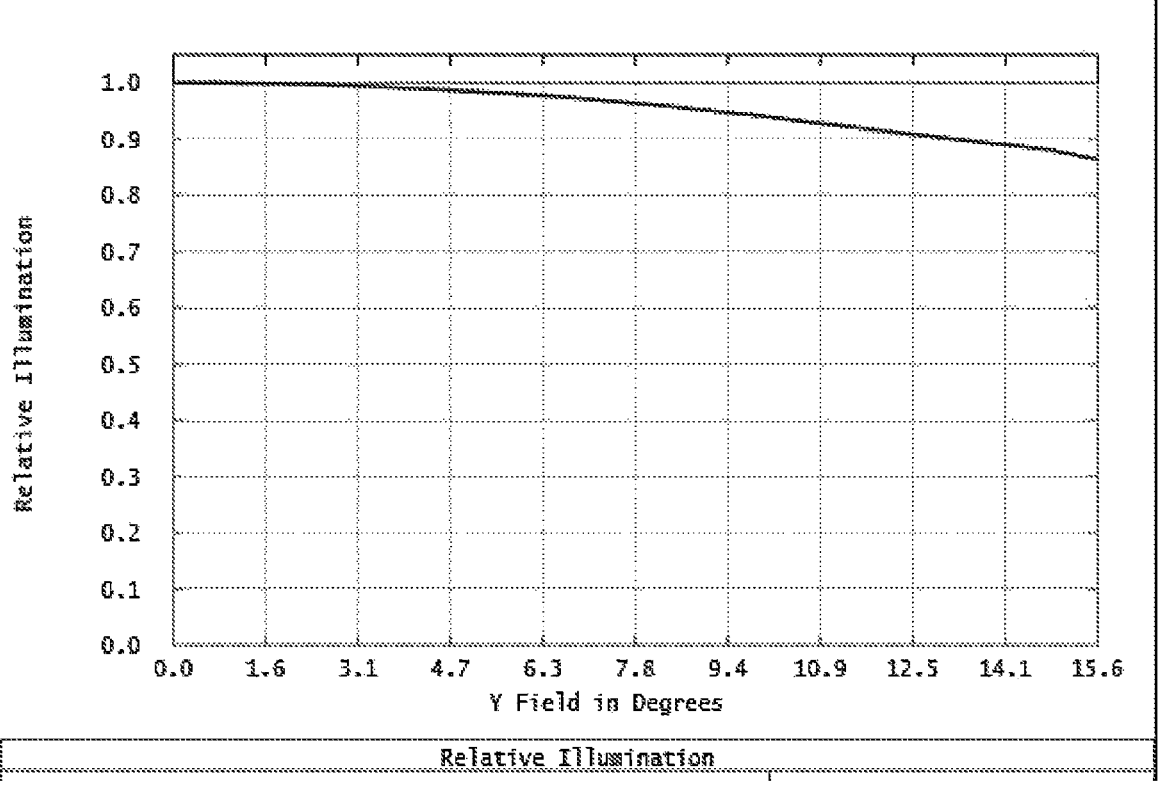
Figure 2F:

FIG. 2A shows an astigmatic curve of the imaging assembly according to Embodiment 1, which represents bending of a meridian image surface and a sagittal image surface. FIG. 2B shows a distortion curve of the imaging assembly according to Embodiment 1, which represents percent of distortion at different image heights. FIG. 2C shows grid distortion of the imaging assembly according to Embodiment 1. FIG. 2D shows a modulation transfer function (MTF) curve of the imaging assembly according to Embodiment 1, where the MTF curve corresponds to a plurality of half diagonal visual field angles, including 0°, 3.63°, 9.37°, 12.30°, and 15.64°. FIG. 2E shows relative illumination of the projected image of the imaging assembly according to Embodiment 1. According to FIG. 2A to FIG. 2E, the relationship between the focal length of the second lens and the focal length of the system, and the relationship between the aperture of the image side surface of the first lens and the total length of the system are adjusted, that is to say, the values of $|f2/f|$ and $\Phi11/TTL$ are adjusted to ensure the definition of the projected image while achieving the miniaturization of the imaging assembly. Herein, FIG. 2F shows a specific projection imaging effect of the imaging assembly according to Embodiment 1.

Embodiment 2

The imaging assembly according to Embodiment 2 of the present disclosure is described below with reference to FIGS. 3 to FIG. 4F. A dashed and dotted line in FIG. 3 represents the optical axis of the imaging assembly.

Figure 3:
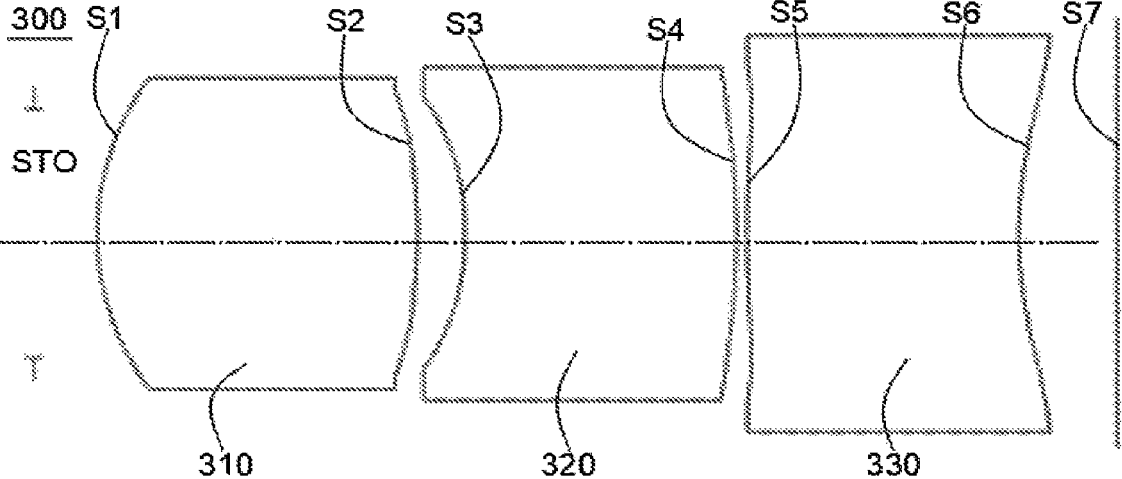
FIG. 3 is a schematic diagram of an imaging assembly according to an embodiment 2 of the present disclosure.

FIG. 3 shows a schematic structural diagram of the imaging assembly according to Embodiment 2. As shown in FIG. 3, the imaging assembly includes the diaphragm STO, the first lens 310, the second lens 320, and the third lens 330 in sequence from the image side to the object side along the optical axis. The diaphragm is positioned on the image side of the first lens.

The first lens 310 has the negative power, and both the image side surface S1 and the object side surface S2 thereof are the aspherical surfaces. Moreover, the image side surface S1 of the first lens 310 is the convex surface at the optical axis and is the convex surface at the circumference, and the object side surface S2 of the first lens 310 is the convex surface at the optical axis and is the concave surface at the circumference.

The second lens 320 has the negative power, and both the image side surface S3 and the object side surface S4 thereof are the aspherical surfaces. Moreover, the image side surface S3 of the second lens 320 is the concave surface at the optical axis and is the convex surface at the circumference, and the object side surface S4 of the second lens 320 is the convex surface at the optical axis and is the convex surface at the circumference.

The third lens 330 has the positive power, and both the image side surface S5 and the object side surface S6 thereof are the aspherical surfaces. Moreover, the image side surface S5 of the third lens 330 is the convex surface at the optical axis and is the concave surface at the circumference, and the object side surface S6 of the third lens 330 is the concave surface at the optical axis and is the convex surface at the circumference.

The diaphragm STO is positioned on the image side of the first lens 310 to further improve the brightness of the image of the imaging assembly, thereby improving the imaging definition of the imaging assembly.

Table 3 shows the surface type, the radius of curvature, the thickness, the refractive index, and the conic of each lens of the imaging assembly according to Embodiment 2, where the total length, the radius of curvature, and the thickness of the imaging assembly are all in millimeters (mm).

TABLE 3

| | EFL = 8.815 mm | | FOV = 16.172° | | TTL = 12.003 mm | |
|---|---|---|---|---|---|---|
| Surface number | Surface type | Radius of curvature | Thickness | Refractive index of material | Fno = 2.979 Conic | |
| OBJ | Spherical surface | Infinity | 1000 | | | |
| STO | Spherical surface | Infinity | 0.7000 | | | |
| S1 | Aspherical surface | 3.2832 | 3.5501 | 1.50 | −0.0982 | |
| S2 | Aspherical surface | −7.2271 | 0.5319 | | −4.9338 | |
| S3 | Aspherical surface | −3.2521 | 3.0001 | 1.65 | −4.2996 | |
| S4 | Aspherical surface | −10.8916 | 0.1270 | | −107.0620 | |

TABLE 3-continued

| EFL = 8.815 mm | | FOV = 16.172° | | TTL = 12.003 mm | |
|---|---|---|---|---|---|
| Surface number | Surface type | Radius of curvature | Thickness | Refractive index of material | Fno = 2.979 Conic |
| S5 | Aspherical surface | 12.9629 | 3.0000 | 1.61 | 19.0750 |
| S6 | Aspherical surface | 4.5481 | 1.0944 | | 0.1747 |
| S7 | Spherical surface | Infinity | — | | |

It may be seen from Table 3 that in this embodiment, the first lens (310) to the third lens (330) are all the plastic aspherical lenses, and each aspherical surface type x is defined by the following formula:

$$x = \frac{ch^2}{1 + \sqrt{1 - (k+1)c^2h^2}} + \sum A i h^i;$$

where x is the vector height of the distance between the position of the aspherical surface at the height h along the optical axis and the vertex of the aspherical surface; c is the paraxial curvature of the aspherical surface; and c=1/R (that is to say, the paraxial curvature c is the reciprocal of the radius R of curvature in Table 3); k is the conic; and $Ai$ is the $i^{th}$-order coefficient of the aspherical surface. Table 4 below shows the high-order coefficients A4, A6, A8, A10; and A12 that may be used for the aspherical surfaces S1 to S6 of the lenses in Embodiment 2.

It should be understood that the aspherical surface of each lens in the imaging assembly 300 may be the aspherical surface shown in the above aspherical surface formula or other aspherical surface formula, which is not limited in the present disclosure.

bending of the meridian image surface and the sagittal image surface. FIG. 4B shows the distortion curve of the imaging assembly according to Embodiment 2, which represents the percent of distortion at different image heights. FIG. 4C shows the grid distortion of the imaging assembly according to Embodiment 2. FIG. 41) shows the MTF curve of the imaging assembly according to Embodiment 2, where the MTF curve corresponds to the plurality of half diagonal visual field angles, including 0°, 3.63°, 9.37°, 12.30°, and 15.64°. FIG. 4E shows the relative illumination of the projected image of the imaging assembly according to Embodiment 2. According to FIG. 4A to FIG. 4E, the relationship between the focal length of the second lens and the focal length of the system, and the relationship between the aperture of the image side surface of the first lens and the total length of the system are adjusted, that is to say, the values of |f2/f| and Φ11/TTL are adjusted to ensure the definition of the projected image while achieving the miniaturization of the imaging assembly. Herein, FIG. 4F shows the specific projection imaging effect of the imaging assembly according to Embodiment.

Embodiment 3

The imaging assembly according to Embodiment 3 of the present disclosure is described below with reference to FIG.

TABLE 4

| Surface number | A4 | A6 | A8 | A10 | A12 |
|---|---|---|---|---|---|
| S1 | −6.7358370E−04 | −1.0972788E−03 | −3.3863085E−04 | −2.4175251E−04 | 5.4674112E−07 |
| S2 | −1.7691347E−03 | −5.6913754E−03 | −2.5186933E−03 | −7.6674992E−04 | 5.2872316E−04 |
| S3 | −7.4548928E−03 | −5.6815393E−03 | −3.3374164E−03 | −1.9015417E−03 | 5.4831838E−04 |
| S4 | −4.8326658E−03 | 5.2294509E−03 | −7.4146507E−04 | 2.0098882E−04 | −3.1067586E−04 |
| S5 | −1.9496813E−02 | −4.3299972E−03 | 2.5235424E−03 | −2.4421976E−04 | −1.2520138E−04 |
| S6 | −2.8150134E−02 | −2.2611956E−03 | 2.6565483E−03 | −1.8417215E−03 | 3.0399723E−04 |

It may be seen that in combination with the data in Table 3 and Table 4, the imaging assembly in Embodiment 2 satisfies the following relational expressions:

|f2/f|=0.958, where f2 is the focal length of the second lens, and f is the focal length of the imaging assembly.

Φ11/TTL=0.312, where Φ11 is the aperture of the image side surface of the first lens, and TTL is the total length of the imaging assembly.

IH/TTL=0.216, where IH is the maximum image height of the projected image of the imaging assembly.

CTmax−CTmin=0.550, where $CT_{max}$ is the maximum thickness of each lens, and CTmin is the minimum thickness of each lens.

f1−f=−3.734, where f1 is the focal length of the first lens.

f3−f2=−4.822, where f3 is the focal length of the third lens.

Figure 4A:
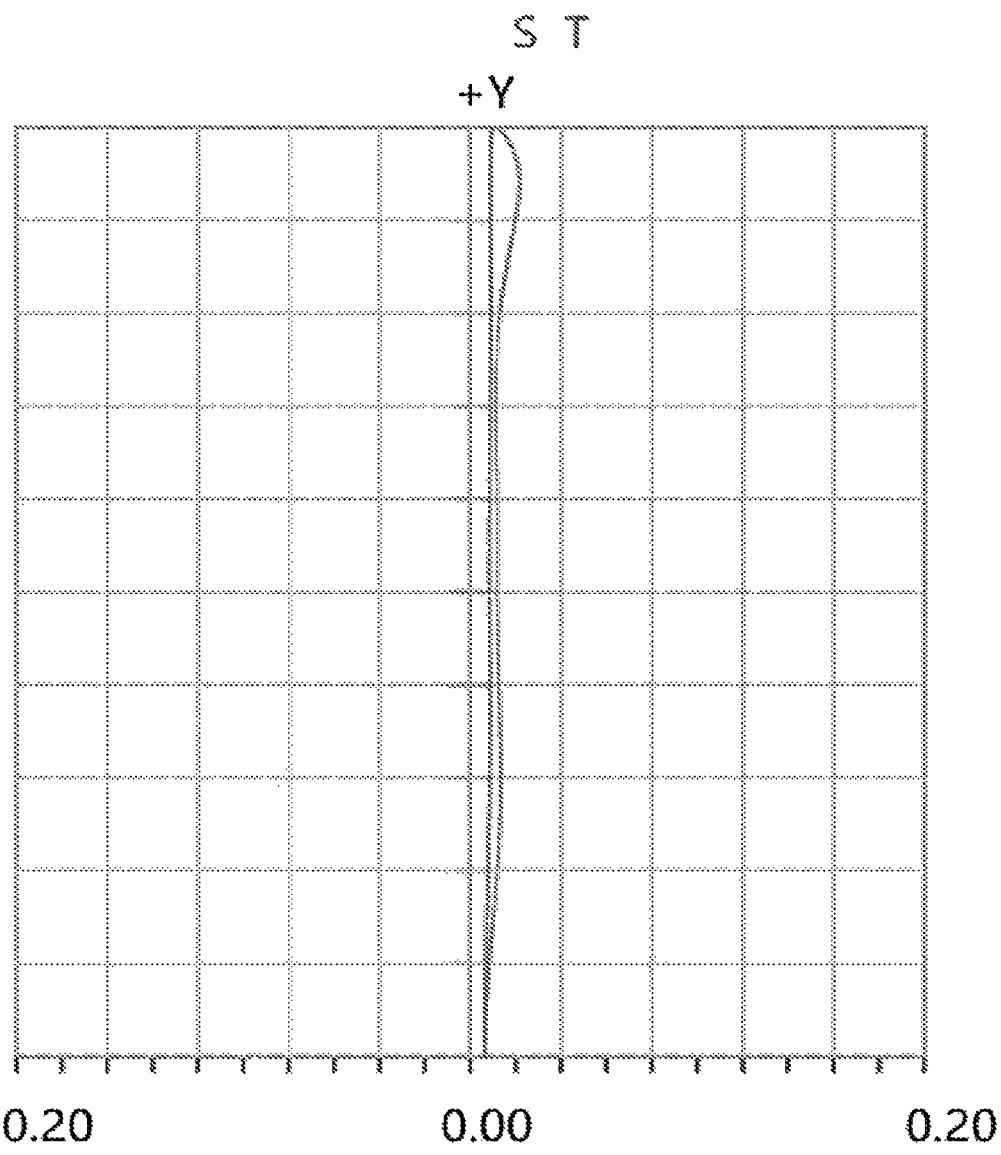
FIG. 4A to FIG. 4F are respectively an astigmatic curve, a distortion curve graph, a grid distortion graph, an MTF curve graph, a relative illumination graph, and a projection imaging graph of the imaging assembly according to the embodiment 2.
Figure 4B:
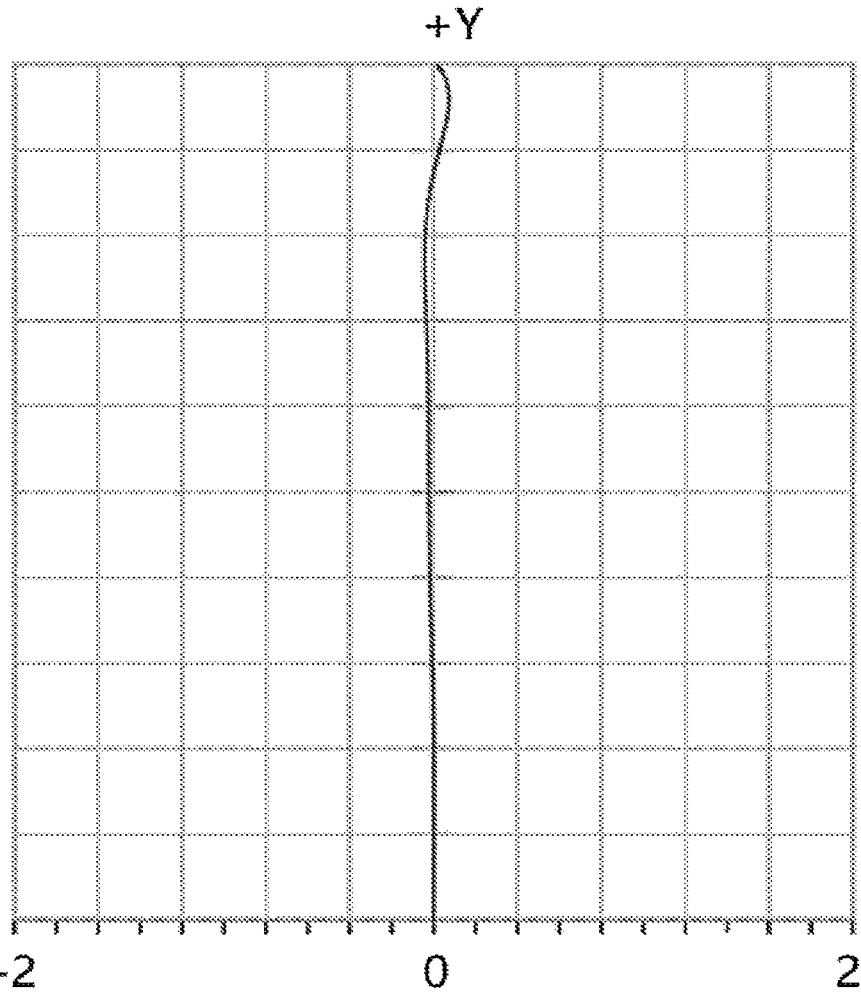
Figure 4C:
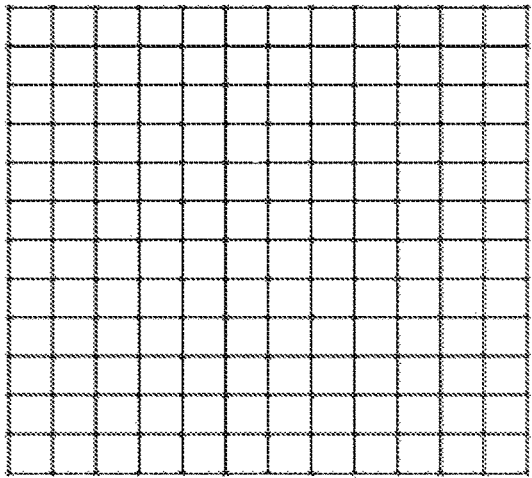
Figure 4D:
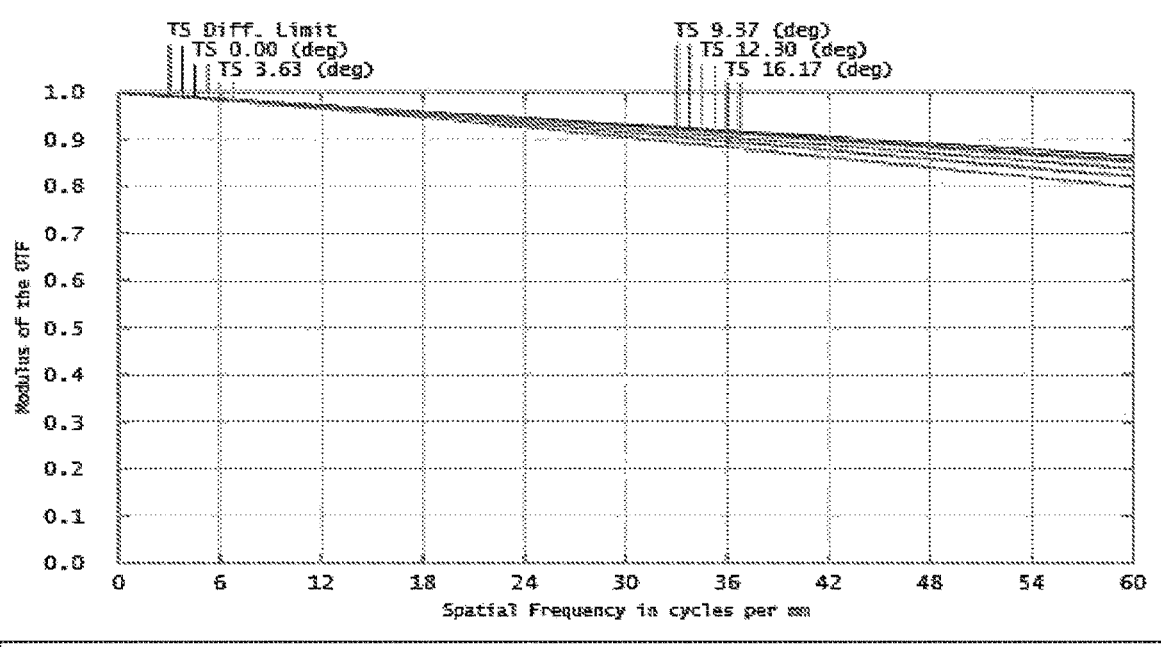
Figure 4E:
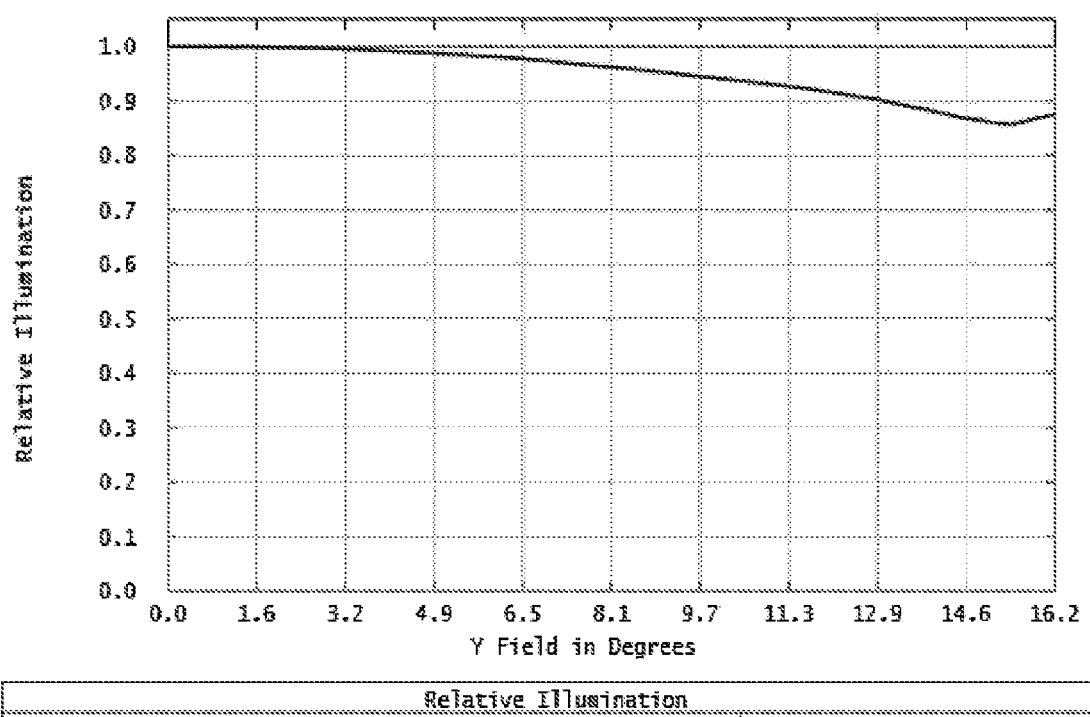
Figure 4F:
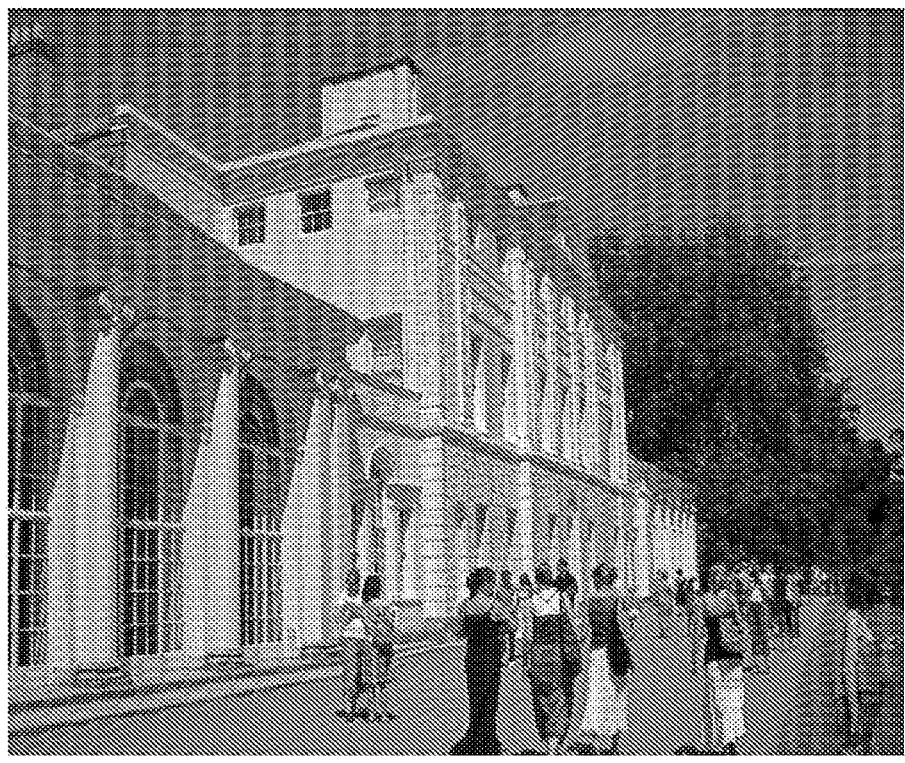
Figure 5:
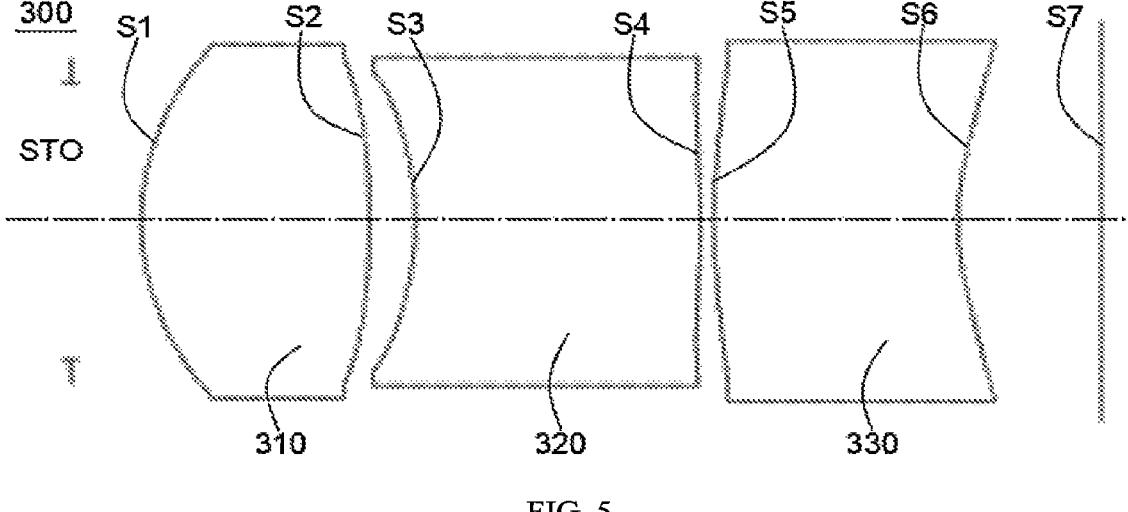
FIG. 5 is a schematic diagram of an imaging assembly according to an embodiment 3 of the present disclosure.
Figure 6A:
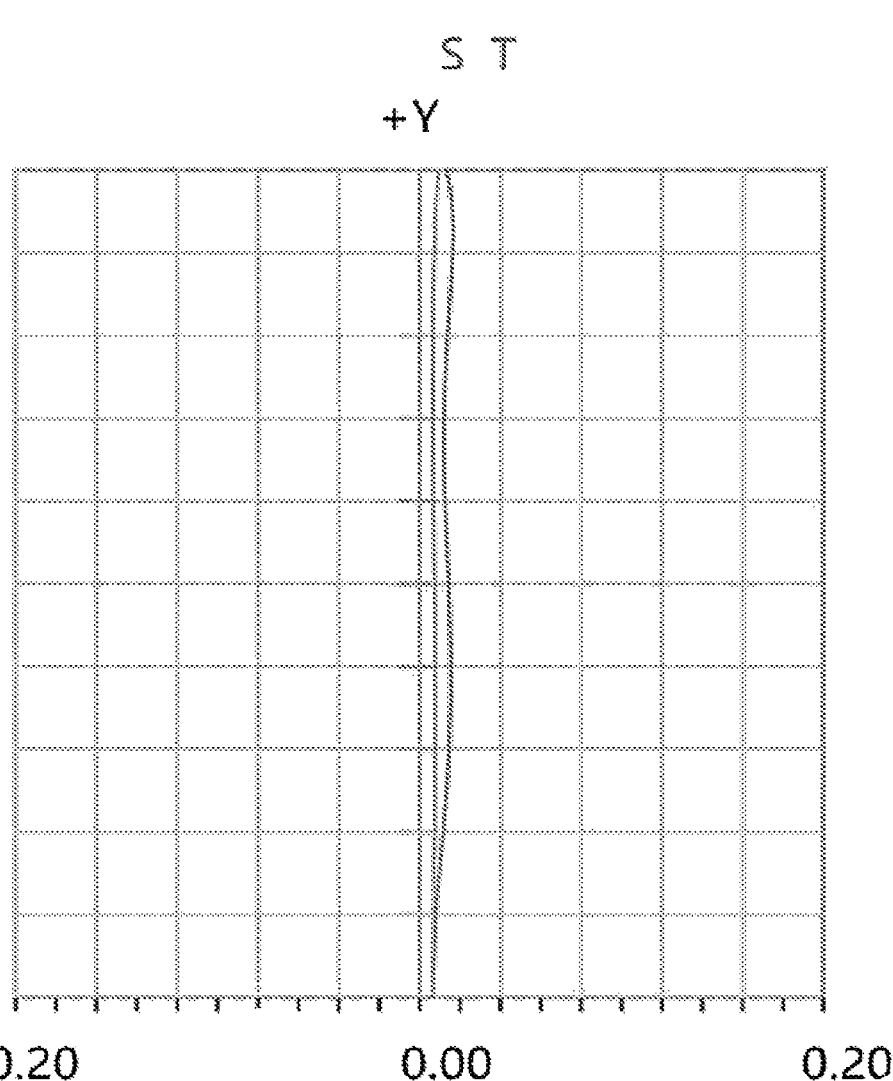
FIG. 6A to FIG. 6E are respectively an astigmatic curve, a distortion curve graph, a grid distortion graph, an MTF curve graph, and a relative illumination graph of the imaging assembly according to the embodiment 3.
Figure 6B:
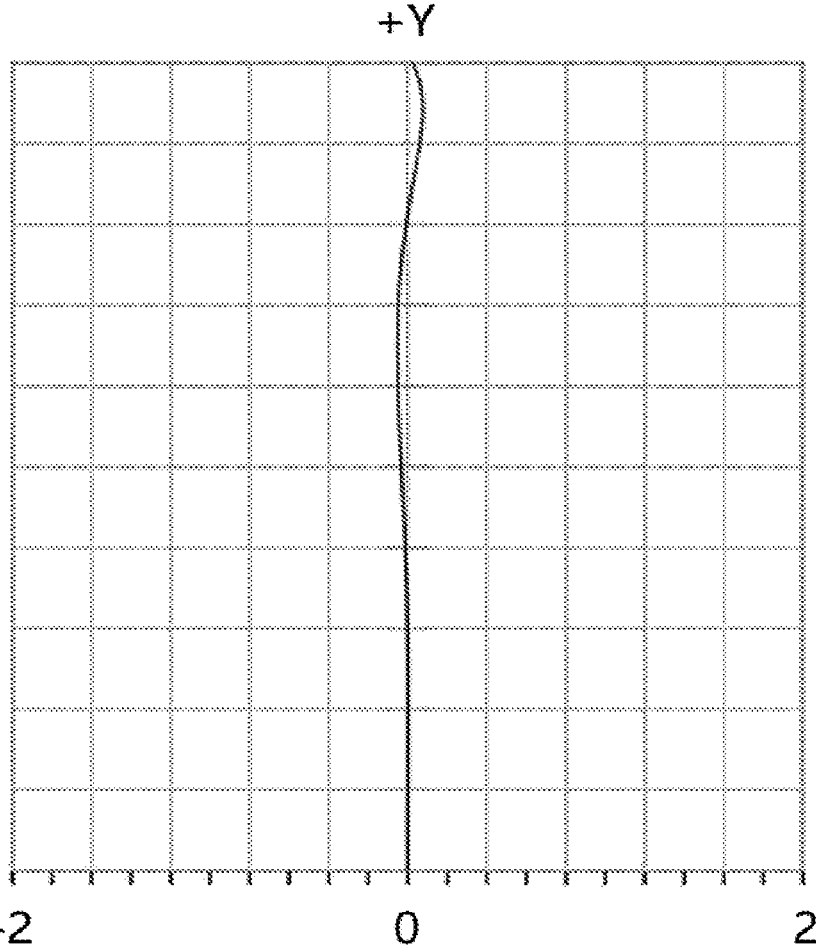
Figure 6C:
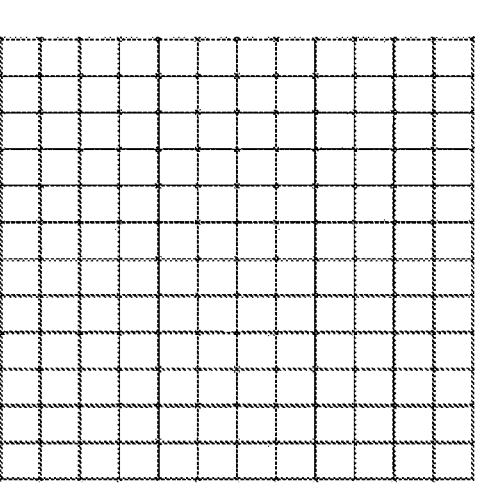
Figure 6D:
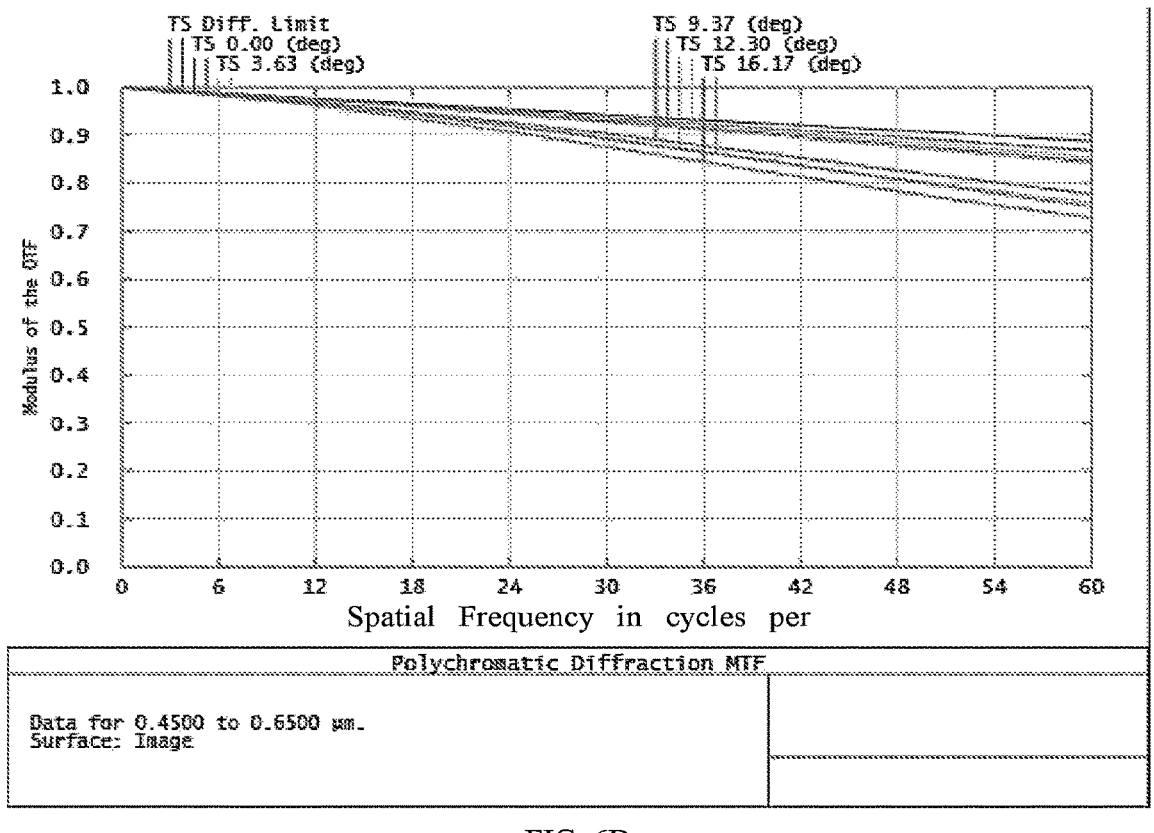
Figure 6E:
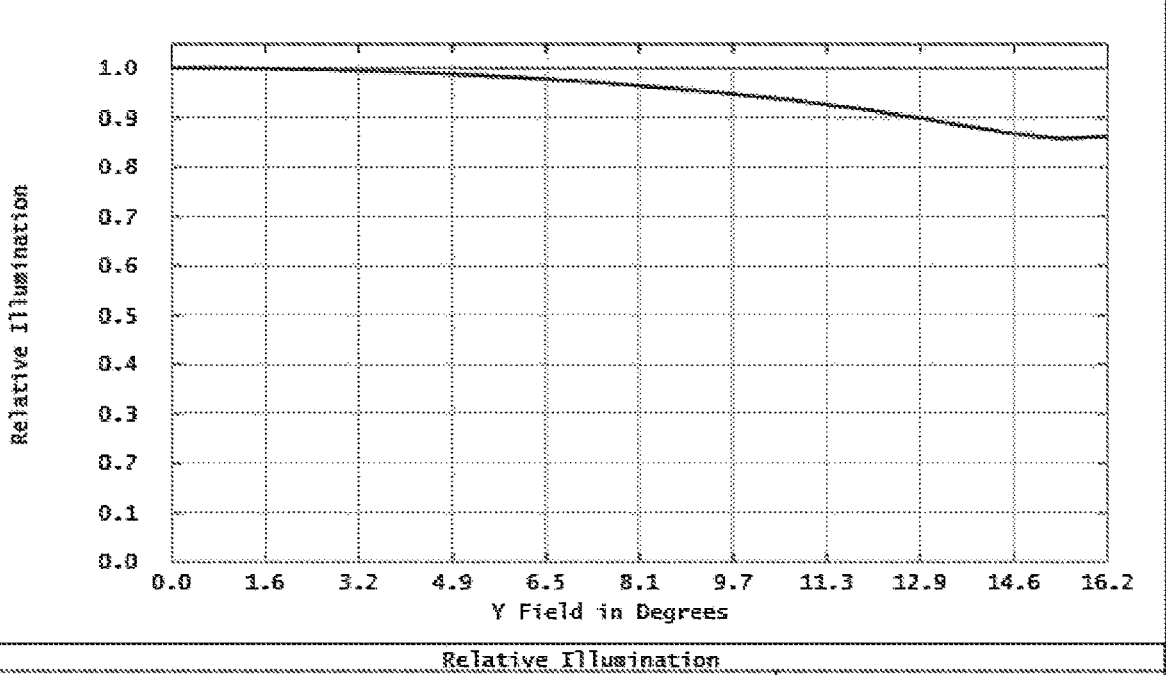

FIG. 4A shows the astigmatic curve of the imaging assembly according to Embodiment 2, which represents the 5 to FIG. 6E, A dashed and dotted line: in FIG. 5 represents the optical axis of the imaging assembly.

FIG. 5 shows a schematic structural diagram of the imaging assembly according to Embodiment 3. As shown in FIG. 5, the imaging assembly includes the diaphragm STO, the first lens 310, the second lens 320, and the third lens 330 in sequence from the image side to the object side along the optical axis. The diaphragm is positioned on the image side of the first lens.

The first lens 310 has the negative power, and both the image side surface S1 and the object side surface S2 thereof are the aspherical surfaces. Moreover, the image side surface S1 of the first lens 310 is the convex surface at the optical axis and is the convex surface at the circumference, and the object side surface S2 of the first lens 310 is the convex surface at the optical axis and is the concave surface at the circumference.

The second lens 320 has the negative power, and both the image side surface S3 and the object side surface S4 thereof are the aspherical surfaces. Moreover, the image side surface S3 of the second lens 320 is the concave surface at the optical axis and is the convex surface at the circumference, and the object side surface S4 of the second lens 320 is the convex surface at the optical axis and is the concave surface at the circumference.

The third lens 330 has the positive power, and both the image side surface S5 and the object side surface S6 thereof are the aspherical surfaces. Moreover, the image side surface S5 of the third lens 330 is the convex surface at the optical axis and is the concave surface at the circumference, and the object side surface S6 of the third lens 330 is the concave surface at the optical axis and is the concave surface at the circumference.

The diaphragm STO is positioned on the image side of the first lens 310 to further improve the brightness of the image of the imaging assembly, thereby improving the imaging definition of the imaging assembly.

Table 5 shows the surface type, the radius of curvature, the thickness, the refractive index, and the conic of each lens of the imaging assembly according to Embodiment 3, where the total length, the radius of curvature, and the thickness of the imaging assembly are all in millimeters (mm).

TABLE 5

| | | EFL = 7.393 mm | | FOV = 16.172° | TTL = 10.226 mm | |
|---|---|---|---|---|---|---|
| Surface number | Surface type | Radius of curvature | Thickness | Refractive index of material | Fno = 2.487 Conic |
| OBJ | Spherical surface | Infinity | 1000 | | |
| STO | Spherical surface | Infinity | 0.7000 | | |
| S1 | Aspherical surface | 2.8719 | 2.2641 | 1.50 | −0.3135 |
| S2 | Aspherical surface | −7.7384 | 0.4537 | | 17.3874 |
| S3 | Aspherical surface | −3.3773 | 2.8333 | 1.64 | −5.8308 |
| S4 | Aspherical surface | −11.3909 | 0.1270 | | −60.3008 |
| S5 | Aspherical surface | 6.4206 | 2.4348 | 1.61 | −12.6763 |
| S6 | Aspherical surface | 3.2269 | 1.4130 | | 2.2332 |
| S7 | Spherical surface | Infinity | — | | |

It may be seen from Table 5 that in this embodiment, the first lens 310 to the third lens 330 are all plastic aspherical lenses, and each aspherical surface type x is defined by the following formula:

$$x = \frac{ch^2}{1 + \sqrt{1 - (k+1)c^2h^2}} + \sum Aih^i;$$

where x is the vector height of the distance between the position of the aspherical surface at the height h along the optical axis and the vertex of the aspherical surface; c is the paraxial curvature of the aspherical surface, and c=1/R (that is to say, the paraxial curvature c is the reciprocal of the radius R of curvature in Table 5); k is the conic; and Ai is the $i^{th}$-order coefficient of the aspherical surface. Table 6 below shows the high-order coefficients A4, A6, A8, A10, and A12 that may be used for the aspherical surfaces S1 to S6 of the lenses in Embodiment 3.

It should be understood that the aspherical surface of each lens in the imaging assembly 300 may be the aspherical surface shown in the above aspherical surface formula or other aspherical surface formula, which is not limited in the present disclosure.

TABLE 6

| Surface number | A4 | A6 | A8 | A10 | A12 |
|---|---|---|---|---|---|
| S1 | −2.1350705E−05 | 1.3291820E−04 | −1.4365705E−04 | −1.9675396E−05 | 9.0206303E−06 |
| S2 | 6.1272604E−05 | −1.5205138E−03 | −8.6234500E−04 | −8.4632336E−05 | 5.9940282E−05 |
| S3 | −5.2620854E−03 | −1.7875506E−03 | −5.3891476E−04 | −2.9639182E−04 | 8.3569159E−05 |
| S4 | −1.8317769E−04 | 4.5816620E−03 | 8.6301613E−05 | −2.5793776E−06 | −5.6843347E−05 |
| S5 | −1.0139088E−02 | 2.8872082E−03 | 2.9497063E−04 | 2.9498635E−06 | −5.3127320E−05 |
| S6 | −3.0754836E−02 | 3.8963495E−03 | −6.7367440E−04 | 1.0498520E−04 | −1.4739250E−05 |

It may be seen that in combination with the data in Table 5 and Table 6, the imaging assembly in Embodiment 3 satisfies the following relational expressions:

|f2/f|=1.187, where f2 is the focal length of the second lens, and f is the focal length of the imaging assembly.

$\Phi11$/TTL=0.373, where $\Phi11$ is the aperture of the image side surface of the first lens, and TTL is the total length of the imaging assembly.

IH/TTL=0.212, where IH is the maximum image height of the projected image of the imaging assembly.

CTmax–CTmin=0.569, where CTmax is the maximum thickness of each lens, and CTmin is the minimum thickness of each lens.

f1–f=–2.890, where f1 is the focal length of the first lens.

f3–f2=–6.168, where f3 is the focal length of the third lens.

FIG. 6A shows the astigmatic curve of the imaging assembly according to Embodiment 3, which represents the bending of the meridian image surface and the sagittal image surface. FIG. 6B shows the distortion curve of the imaging assembly according to Embodiment 3, which represents the percent of distortion at different image heights. FIG. 6C shows the grid distortion of the imaging assembly according to Embodiment 3. FIG. 6D shows the MTF curve of the imaging assembly according to Embodiment 3, where the MTF curve corresponds to the plurality of half diagonal visual field angles, including 0°, 3.63°, 9.37°, 12.30°, and 15.64°. FIG. 6E shows the relative illumination of the projected image of the imaging assembly according to Embodiment 3. According to FIG. 6A to FIG. 6E, the relationship between the focal length of the second lens and the focal length of the system, and the relationship between the aperture of the image side surface of the first lens and the The first lens 310 has the negative power, and both the image side surface S1 and the object side surface S2 thereof are the aspherical surfaces. Moreover, the image side surface S1 of the first lens 310 is the convex surface at the optical axis and is the convex surface at the circumference, and the object side surface S2 of the first lens 310 is the convex surface at the optical axis and is the concave surface at the circumference.

The second lens 320 has the negative power, and both the image side surface S3 and the object side surface S4 thereof are the aspherical surfaces. Moreover, the image side surface S3 of the second lens 320 is the concave surface at the optical axis and is the concave surface at the circumference, and the object side surface S4 of the second lens 320 is the convex surface at the optical axis and is the concave surface at the circumference.

The third lens 330 has the positive power, and both the image side surface S5 and the object side surface S6 thereof are the aspherical surfaces. Moreover, the image side surface S5 of the third lens 330 is the convex surface at the optical axis and is the concave surface at the circumference, and the object side surface S6 of the third lens 330 is the concave surface at the optical axis and is the concave surface at the circumference.

The diaphragm STO is positioned on the image side of the first lens 310 to further improve the brightness of the image of the imaging assembly, thereby improving the imaging definition of the imaging assembly.

Table 7 shows the surface type, the radius of curvature, the thickness, the refractive index, and the conic of each lens of the imaging assembly according to Embodiment 4, where the total length, the radius of curvature, and the thickness of the imaging assembly are all in millimeters (mm).

TABLE 7

| EFL = 6.408 mm | | FOV = 15.642° | | TTL = 9.522 mm | |
| --- | --- | --- | --- | --- | --- |
| Surface number | Surface type | Radius of curvature | Thickness | Refractive index of material | Fno = 2.009 Conic |
| OBJ | Spherical surface | Infinity | 1000 | | |
| STO | Spherical surface | Infinity | 0.7000 | | |
| S1 | Aspherical surface | 2.9303 | 1.8538 | 1.54 | –0.1134 |
| S2 | Aspherical surface | –9.8540 | 0.5945 | | –51.9117 |
| S3 | Aspherical surface | –3.3375 | 2.5550 | 1.64 | –5.4255 |
| S4 | Aspherical surface | –8.9775 | 0.1270 | | –26.4784 |
| S5 | Aspherical surface | 5.8235 | 2.6416 | 1.54 | –5.3706 |
| S6 | Aspherical surface | 3.6007 | 1.0495 | | 0.4873 |
| S7 | Spherical surface | Infinity | — | | | total length of the system are adjusted, that is to say, the values of |f2/f| and $\Phi11$/TTL are adjusted to ensure the definition of the projected image while achieving the miniaturization of the imaging assembly.

Embodiment 4

The imaging assembly according to Embodiment 4 of the present disclosure is described below with reference to FIG. 7 to FIG. 8E. A dashed and dotted line in FIG. 7 represents the optical axis of the imaging assembly.

Figure 7:
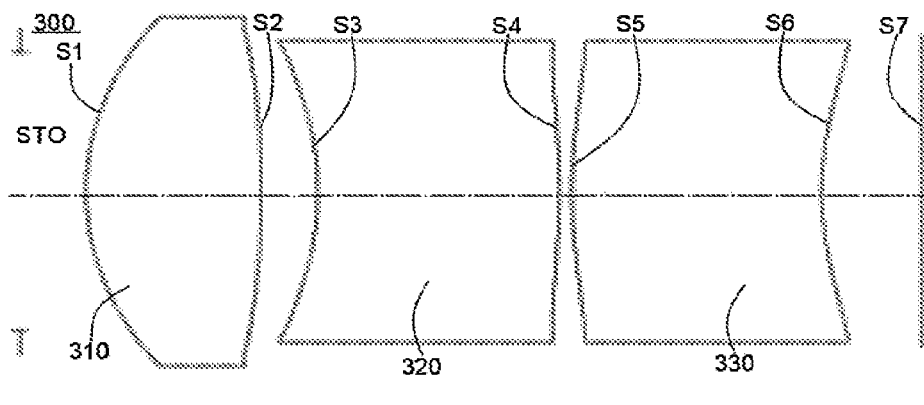
FIG. 7 is a schematic diagram of an imaging assembly according to an embodiment 4 of the present disclosure.

FIG. 7 shows a schematic structural diagram of the imaging assembly according to Embodiment 4. As shown in FIG. 7, the imaging assembly includes the diaphragm STO, the first lens 310, the second lens 320, and the third lens 330 in sequence from the image side to the object side along the optical axis. The diaphragm is positioned on the image side of the first lens.

It may be seen from Table 7 that in this embodiment, the first lens 310 to the third lens 330 are all plastic aspherical lenses, and each aspherical surface type x is defined by the following formula:

$$x = \frac{ch^2}{1 + \sqrt{1 - (k+1)c^2h^2}} + \sum Aih^i;$$

where x is the vector height of the distance between the position of the aspherical surface at the height h along the optical axis and the vertex of the aspherical surface; c is the paraxial curvature of the aspherical surface, and c=1/R (that is to say, the paraxial curvature c is the reciprocal of the radius R of curvature in Table 7); k is the conic; and Ai is the $i^{th}$-order coefficient of the aspherical surface. Table 8 below shows the high-order coefficients A4, A6, A8, A10, and A12 that may be used for the aspherical surfaces S1 to S6 of the lenses in Embodiment 4.

It should be understood that the aspherical surface of each lens in the imaging assembly 300 may be the aspherical surface shown in the above aspherical surface formula or other aspherical surface formula, which is not limited in the present disclosure.

TABLE 8

| Surface number | A4 | A6 | A8 | A10 | A12 |
|---|---|---|---|---|---|
| S1 | −2.1350705E−05 | 1.3291820E−04 | −1.4365705E−04 | −1.9675396E−05 | 9.0206303E−06 |
| S2 | 6.1272604E−05 | −1.5205138E−03 | −8.6234500E−04 | −8.4632336E−05 | 5.9940282E−05 |
| S3 | −5.2620854E−03 | −1.7875506E−03 | −5.3891476E−04 | −2.9639182E−04 | 8.3569159E−05 |
| S4 | −1.8317769E−04 | 4.5816620E−03 | 8.6301613E−05 | −2.5793776E−06 | −5.6843347E−05 |
| S5 | −1.0139088E−02 | 2.8872082E−03 | 2.9497063E−04 | 2.9498635E−06 | −5.3127320E−05 |
| S6 | −3.0754836E−02 | 3.8963495E−03 | −6.7367440E−04 | 1.0498520E−04 | −1.4739250E−05 |

It may be seen that in combination with the data in Table 7 and Table 8, the imaging assembly in Embodiment 4 satisfies the following relational expressions:

$|f2/f|=1.578$, where f2 is the focal length of the second lens, and f is the focal length of the imaging assembly.

$\Phi11/TTL=0.424$, where $\Phi11$ is the aperture of the image side surface of the first lens, and TTL is the total length of the imaging assembly.

$IH/TTL=0.189$, where IH is the maximum image height of the projected image of the imaging assembly.

$CTmax-CTmin=0.788$, where CTmax is the maximum thickness of each lens, and CTmin is the minimum thickness of each lens.

$f1-f=-1.972$, where f1 is the focal length of the first lens.

$f3-f2=-19.948$, where f3 is the focal length of the third lens.

Figure 8A:
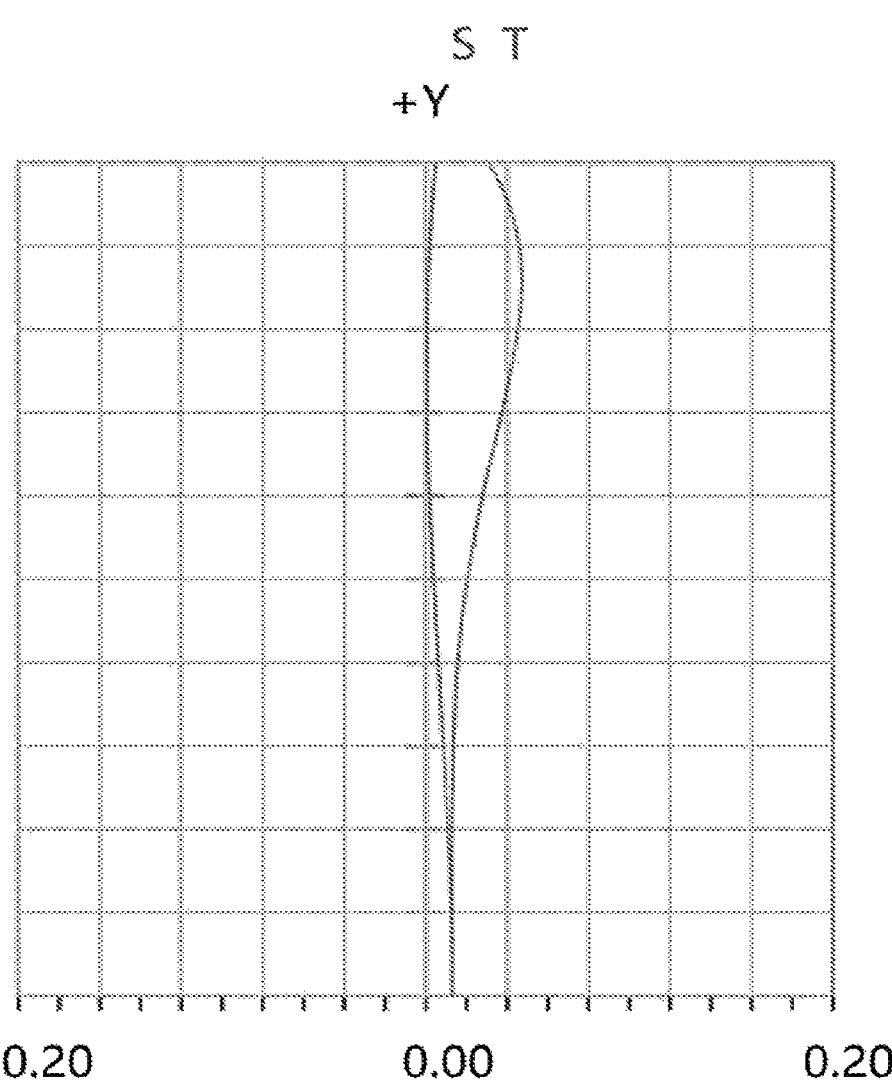
FIG. 8A to FIG. 8E are respectively an astigmatic curve, a distortion curve graph, a grid distortion graph, an MTF curve graph, and a relative illumination graph of the imaging assembly according to the embodiment 4.
Figure 8B:
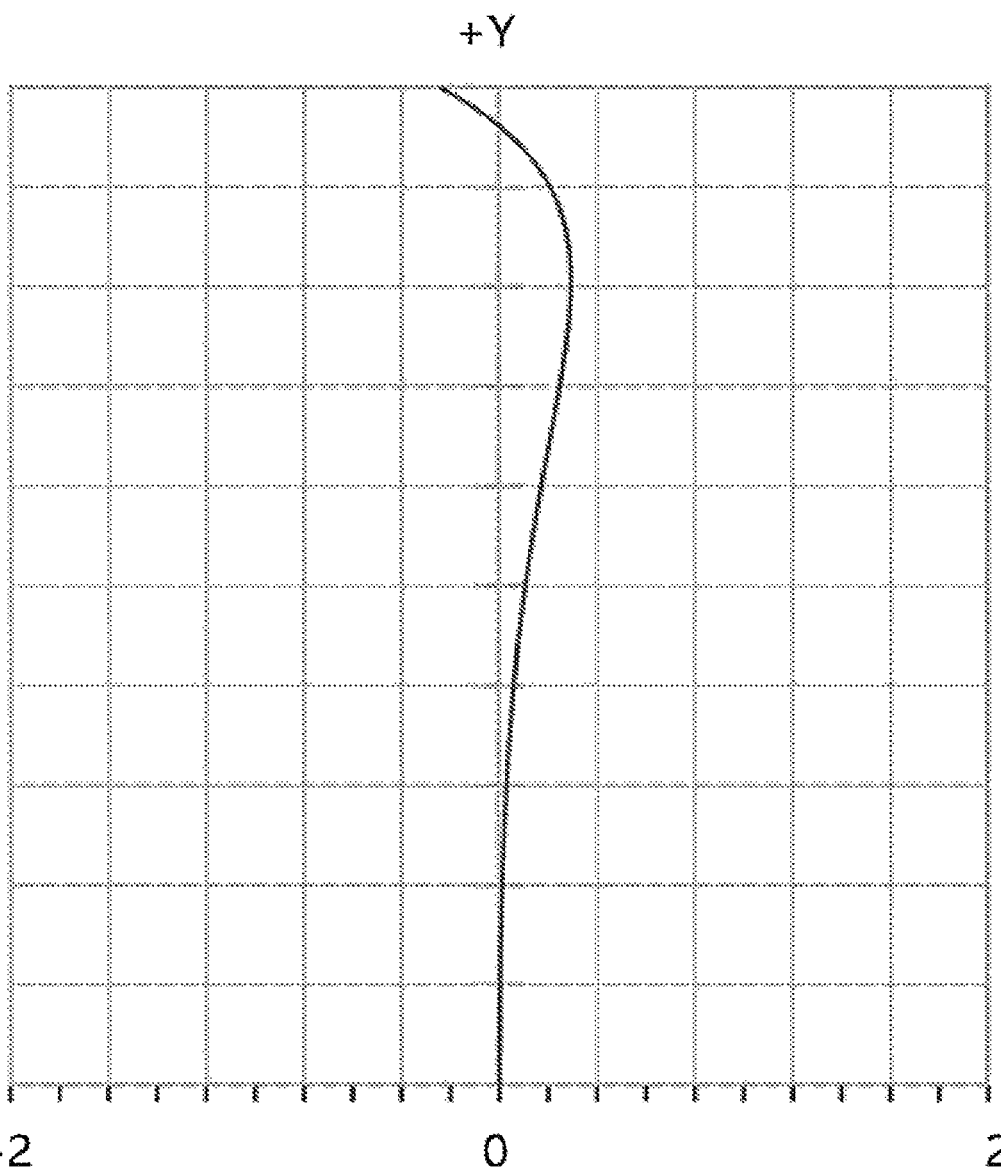
Figure 8C:
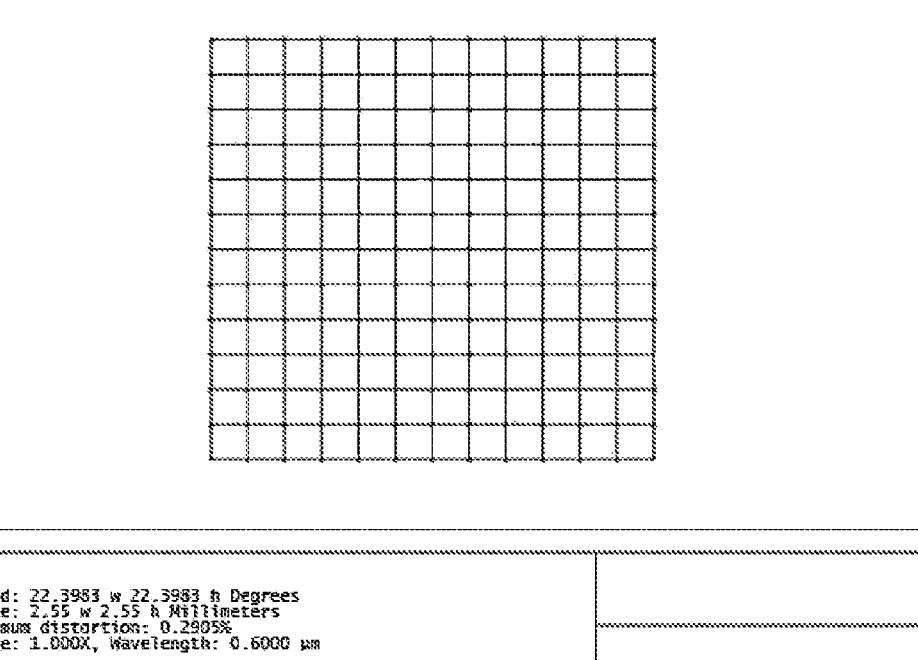
Figure 8D:
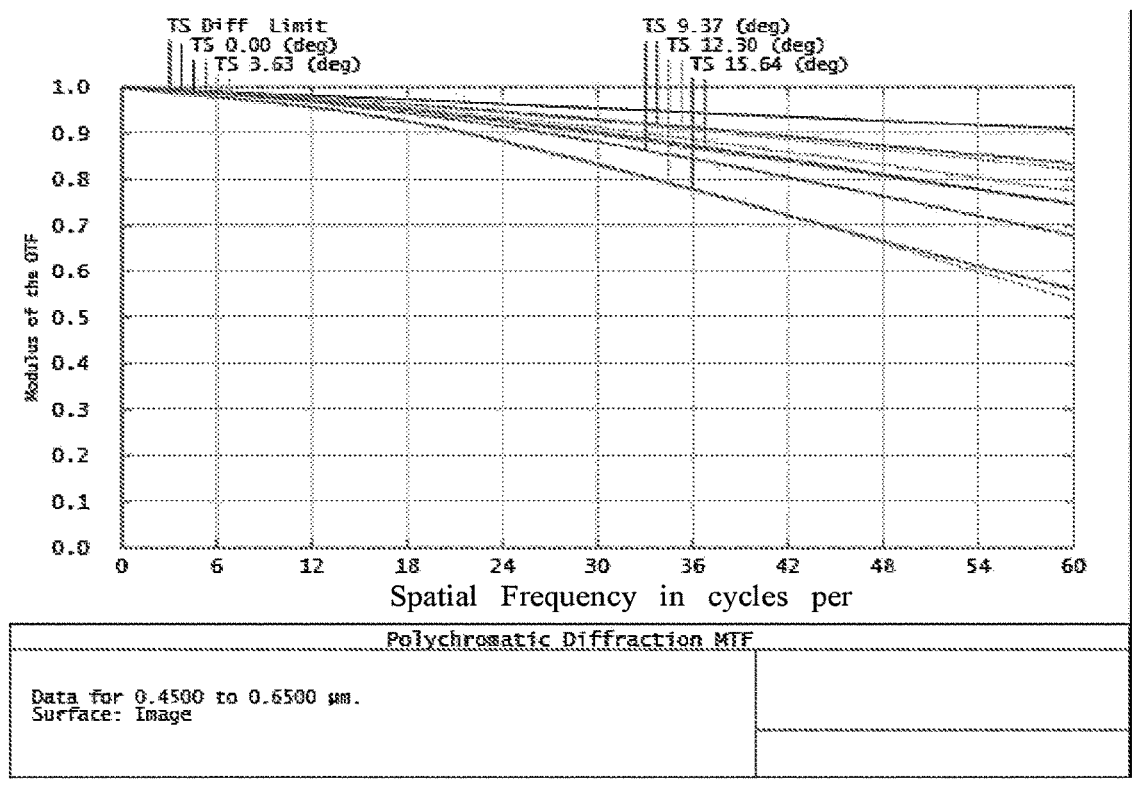
Figure 8E:
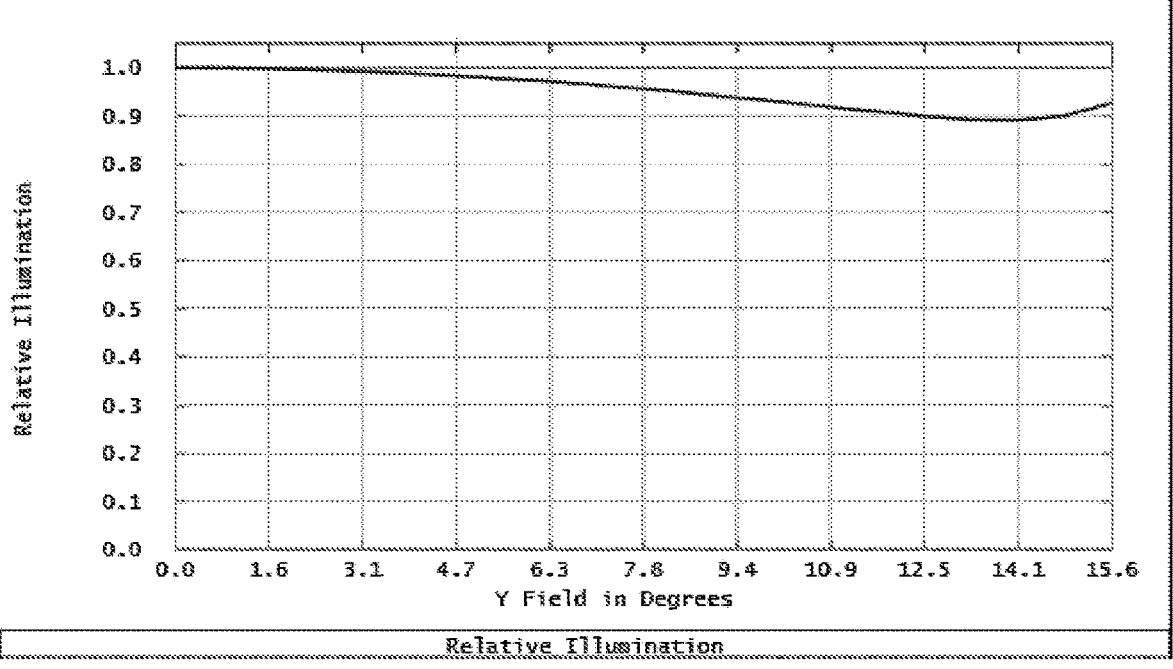

FIG. 8A shows the astigmatic curve of the imaging assembly according to Embodiment 4, which represents the bending of the meridian image surface and the sagittal image surface. FIG. 8B shows the distortion curve of the imaging assembly according to Embodiment 4, which represents the percent of distortion at different image heights. FIG. 8C shows the grid distortion of the imaging assembly according to Embodiment 4. FIG. 8D shows the MTF curve of the imaging assembly according to Embodiment 4, where the MTF curve corresponds to the plurality of half diagonal visual field angles, including 0°, 3.63°, 9.37°, 12.30°, and 15.64° FIG. 8E shows the relative illumination of the projected image of the imaging assembly according to Embodiment 4. According to FIG. 8A to FIG. 8E, the relationship between the focal length of the second lens and the focal length of the system, and the relationship between the aperture of the image side surface of the first lens and the total length of the system are adjusted, that is to say, the values of $|f2/f|$ and $\Phi11/TTL$ are adjusted to ensure the definition of the projected image while achieving the miniaturization of the imaging assembly.

Embodiment 5

The imaging assembly according to Embodiment 5 of the present disclosure is described below with reference to FIG.

Figure 9:
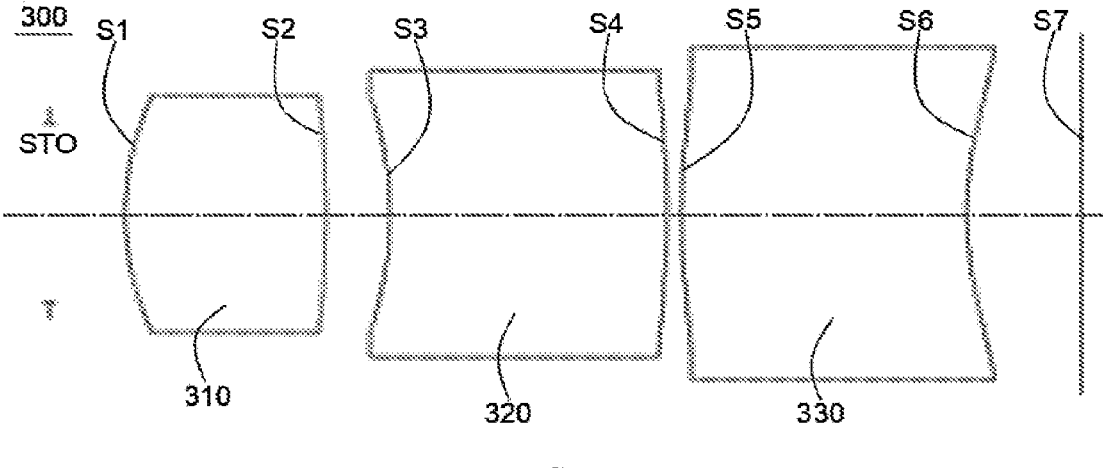
FIG. 9 is a schematic diagram of an imaging assembly according to an embodiment 5 of the present disclosure.
Figure 10A:
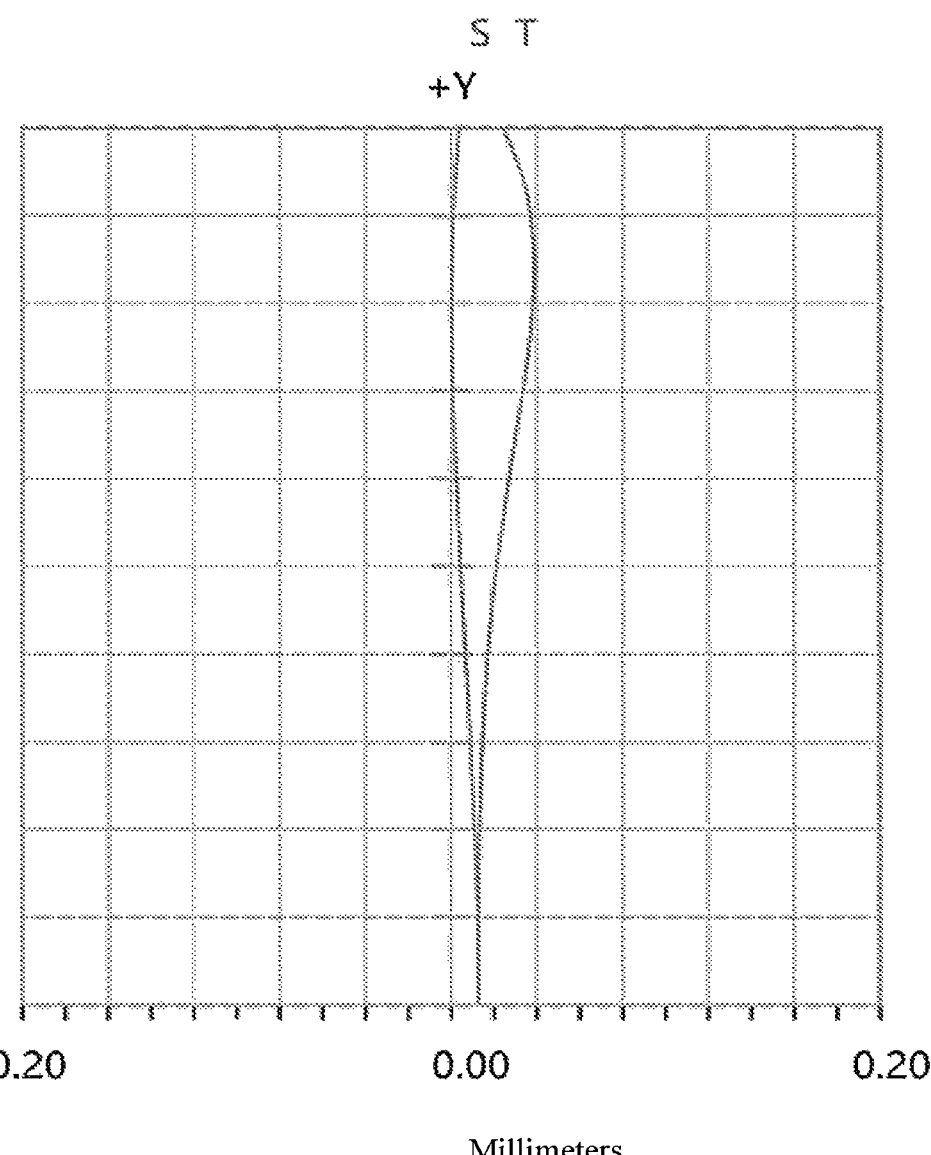
FIG. 10A to FIG. 10E are respectively an astigmatic curve, a distortion curve graph, a grid distortion graph, an MTF curve graph, and a relative illumination graph of the imaging assembly according to the embodiment 5.
Figure 10B:
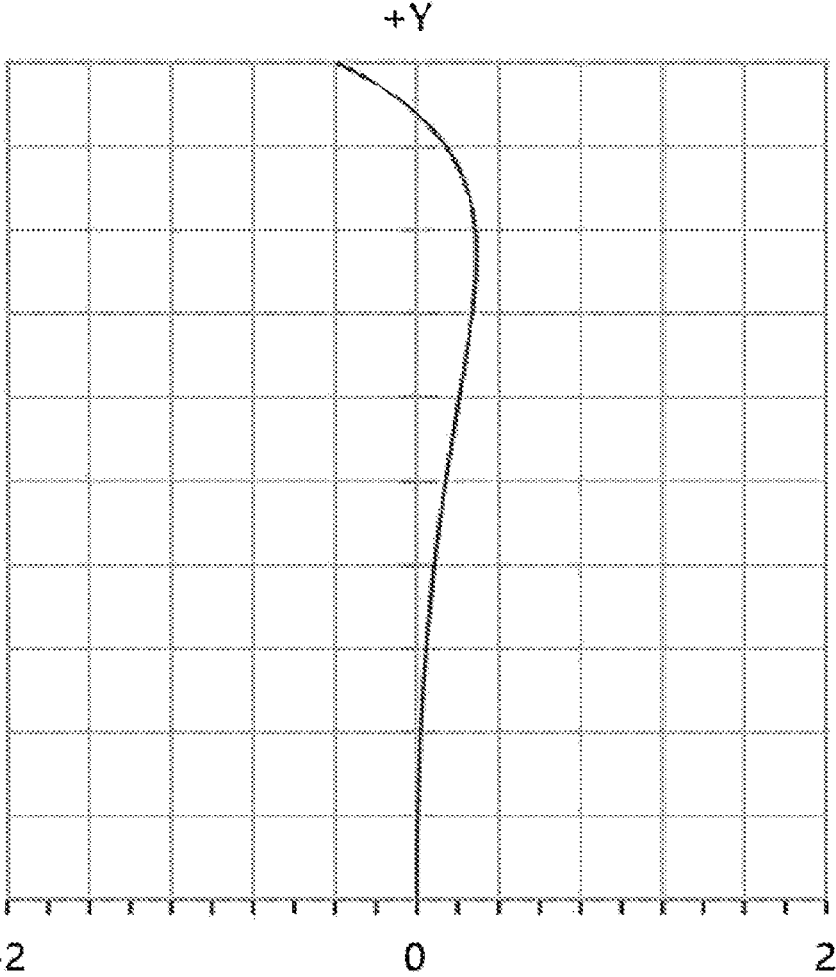
Figure 10C:
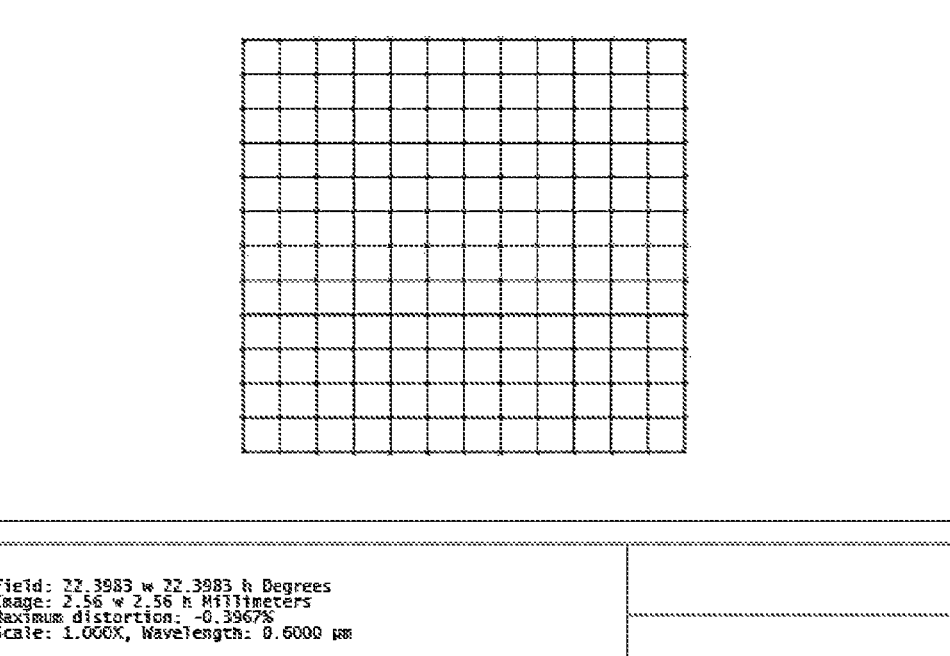
Figure 10D:
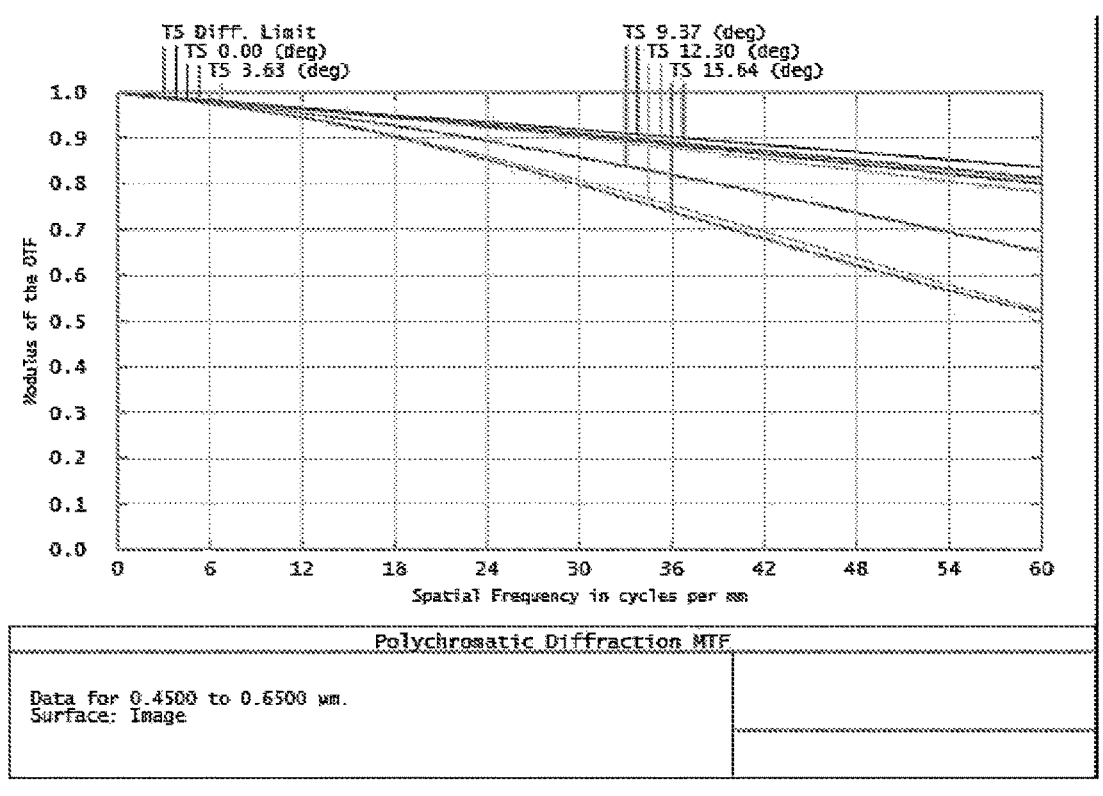
Figure 10E:
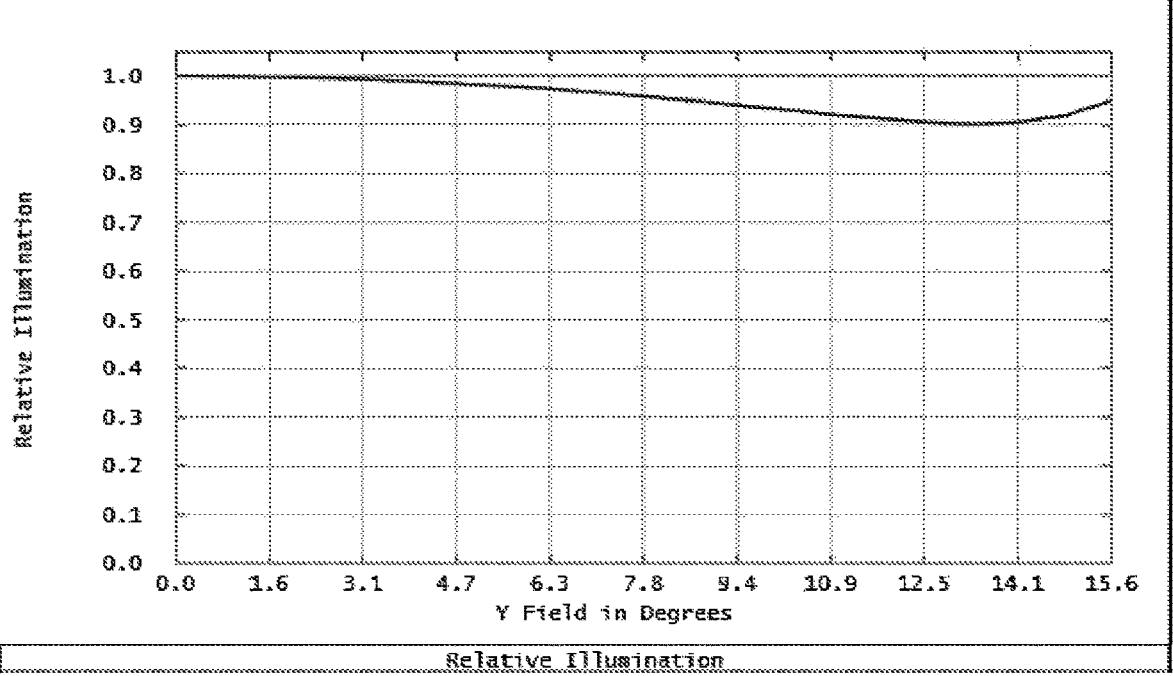

9 to FIG. 10E. A dashed and dotted line in FIG. 9 represents the optical axis of the imaging assembly.

FIG. 9 shows a schematic structural diagram of the imaging assembly according to Embodiment 5. As shown in FIG. 9, the imaging assembly includes the diaphragm STO, the first lens 310, the second lens 320, and the third lens 330 in sequence from the image side to the object side along the optical axis. The diaphragm is positioned on the image side of the first lens.

The first lens 310 has the negative power, and both the image side surface S1 and the object side surface S2 thereof are the aspherical surfaces. Moreover, the image side surface S1 of the first lens 310 is the convex surface at the optical axis and is the convex surface at the circumference, and the object side surface S2 of the first lens 310 is the convex surface at the optical axis and is the convex surface at the circumference.

The second lens 320 has the negative power, and both the image side surface S3 and the object side surface S4 thereof are the aspherical surfaces. Moreover, the image side surface S3 of the second lens 320 is the concave surface at the optical axis and is the convex surface at the circumference, and the object side surface S4 of the second lens 320 is the convex surface at the optical axis and is the convex surface at the circumference.

The third lens 330 has the positive power, and both the image side surface S5 and the object side surface S6 thereof are the aspherical surfaces. Moreover, the image side surface S5 of the third lens 330 is the convex surface at the optical axis and is the concave surface at the circumference, and the object side surface S6 of the third lens 330 is the concave surface at the optical axis and is the concave surface at the circumference.

The diaphragm STO is positioned on the image side of the first lens 310 to further improve the brightness of the image of the imaging assembly, thereby improving the imaging definition of the imaging assembly.

Table 9 shows the surface type, the radius of curvature, the thickness, the refractive index, and the conic of each lens of the imaging assembly according to Embodiment 5, where the total length, the radius of curvature, and the thickness of the imaging assembly are all in millimeters (mm).

TABLE 9

| Surface number | Surface type | Radius of curvature | Thickness | Refractive index of material | Conic |
|---|---|---|---|---|---|
| EFL = 6.416 mm | | FOV = 15.642° | TTL = 9.470 mm | Fno = 3.626 | |
| OBJ | Spherical surface | Infinity | 1000 | | |
| STO | Spherical surface | Infinity | 0.7000 | | |
| S1 | Aspherical surface | 2.9248 | 1.8436 | 1.54 | −0.0942 |
| S2 | Aspherical surface | −9.6091 | 0.5891 | | −60.1833 |
| S3 | Aspherical surface | −3.4133 | 2.5417 | 1.64 | −5.7101 |
| S4 | Aspherical surface | −9.2708 | 0.1270 | | −23.6211 |
| S5 | Aspherical surface | 6.2657 | 2.6254 | 1.54 | −10.2665 |
| S6 | Aspherical surface | 3.6685 | 1.0436 | | 0.4105 |
| S7 | Spherical surface | Infinity | — | | |

It may be seen from Table 9 that in this embodiment, the first lens 310 to the third lens 330 are all plastic aspherical lenses, and each aspherical surface type x is defined by the following formula:

$$x = \frac{ch^2}{1 + \sqrt{1 - (k+1)c^2h^2}} + \sum A_i h^i;$$

where x is the vector height of the distance between the position of the aspherical surface at the height h along the optical axis and the vertex of the aspherical surface; c is the paraxial curvature of the aspherical surface, and c=1/R (that is to say, the paraxial curvature c is the reciprocal of the radius R of curvature in Table 9); k is the conic; and Ai is the $i^{th}$-order coefficient of the aspherical surface. Table 10 below shows the high-order coefficients A4, A6, A8, A10, and A12 that may be used for the aspherical surfaces S1 to S6 of the lenses in Embodiment 5.

It should be understood that the aspherical surface of each lens in the imaging assembly 300 may be the aspherical surface shown in the above aspherical surface formula or other aspherical surface formula, which is not limited in the present disclosure.

f3−f2=−15.310, where f3 is the focal length of the third lens.

FIG. 10A shows the astigmatic curve of the imaging assembly according to Embodiment 5, which represents the bending of the meridian image surface and the sagittal image surface, FIG. 10B shows the distortion curve of the imaging assembly according to Embodiment 5, which represents the percent of distortion at different image heights. FIG. 10C shows the grid distortion of the imaging assembly according to Embodiment 5, FIG. 10D shows the MTF curve of the imaging assembly according to Embodiment 5, where the MTF curve corresponds to the plurality of half diagonal visual field angles, including 0°, 3.63°, 9.37°, 12.30°, and 15.64°. FIG. TOE shows the relative illumination of the projected image of the imaging assembly according to Embodiment 5. According to FIG. 10A to FIG. 10E, the relationship between the focal length of the second lens and the focal length of the system, and the relationship between the aperture of the image side surface of the first lens and the total length of the system are adjusted, that is to say, the values of |f2/f| and Φ11/TTL are adjusted to ensure the definition of the projected image while achieving the miniaturization of the imaging assembly.

TABLE 10

| Surface number | A4 | A6 | A8 | A10 | A12 |
|---|---|---|---|---|---|
| S1 | 6.3832830E−04 | −5.4752790E−04 | −1.5374371E−04 | 6.9456994E−05 | 1.3486421E−04 |
| S2 | −3.0195243E−03 | 4.0211729E−04 | 5.1215945E−04 | 1.0531002E−04 | −2.9627428E−05 |
| S3 | −2.6423980E−03 | 7.3223081E−04 | 2.0831885E−04 | −3.2834712E−04 | 2.7580000E−05 |
| S4 | 2.1513128E−04 | 2.8013662E−03 | 7.8758988E−05 | −1.7320606E−04 | −3.5004692E−05 |
| S5 | −1.3226388E−02 | 1.2422028E−03 | −9.9637752E−05 | −1.5995283E−05 | −7.7106613E−05 |
| S6 | −1.8816848E−02 | 2.5959318E−04 | 3.1498359E−07 | −7.6436154E−05 | −6.4590106E−06 |

It may be seen that in combination with the data in Table 9 and Table 10, the imaging assembly in Embodiment 5 satisfies the following relational expressions:

|f2/f|=1.588, where f2 is the focal length of the second lens, and f is the focal length of the imaging assembly.

Φ11/TTL=0.249, where Φ11 is the aperture of the image side surface of the first lens, and TTL is the total length of the imaging assembly.

IH/TTL=0.190, where IH is the maximum image height of the projected image of the imaging assembly.

CTmax−CTmin=0.782, where CTmax is the maximum thickness of each lens, and CTmin is the minimum thickness of each lens.

f1−f=−2.010, where f1 is the focal length of the first lens.

Embodiment 6

The imaging assembly according to Embodiment 6 of the present disclosure is described below with reference to FIG. 11 to FIG. 12F. A dashed and dotted line in FIG. 11 represents the optical axis of the imaging assembly.

Figure 11:
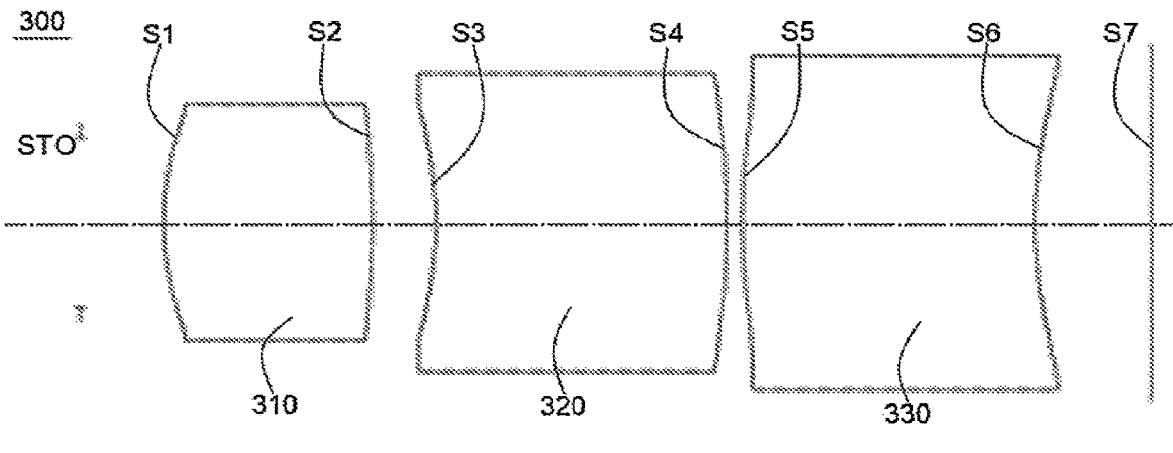
FIG. 11 is a schematic diagram of an imaging assembly according to an embodiment 6 of the present disclosure.

FIG. 11 shows a schematic structural diagram of the imaging assembly according to Embodiment 6. As shown in FIG. 11, the imaging assembly includes the diaphragm STO, the first lens 310, the second lens 320, and the third lens 330 in sequence from the image side to the object side along the optical axis. The diaphragm is positioned on the image side of the first lens.

The first lens 310 has the negative power, and both the image side surface S1 and the object side surface S2 thereof are the aspherical surfaces. Moreover, the image side surface S1 of the first lens 310 is the convex surface at the optical axis and is the concave surface at the circumference, and the object side surface S2 of the first lens 310 is the convex surface at the optical axis and is the convex surface at the circumference.

The second lens 320 has the negative power, and both the image side surface S3 and the object side surface S4 thereof are the aspherical surfaces. Moreover, the image side surface S3 of the second lens 320 is the concave surface at the optical axis and is the convex surface at the circumference, and the object side surface S4 of the second lens 320 is the convex surface at the optical axis and is the convex surface at the circumference.

The third lens 330 has the positive power, and both the image side surface S5 and the object side surface S6 thereof are the aspherical surfaces. Moreover, the image side surface S5 of the third lens 330 is the convex surface at the optical axis and is the concave surface at the circumference, and the object side surface S6 of the third lens 330 is the concave surface at the optical axis and is the concave surface at the circumference.

The diaphragm STO is positioned on the image side of the first lens 310 to further improve the brightness of the image of the imaging assembly, thereby improving the imaging definition of the imaging assembly.

Table 11 shows the surface type, the radius of curvature, the thickness, the refractive index, and the conic of each lens of the imaging assembly according to Embodiment 6, where the total length, the radius of curvature, and the thickness of the imaging assembly are all in millimeters (mm).

TABLE 11

| EFL = 5.725 mm | | FOV = 15.642° | | TTL = 8.969 mm | |
| --- | --- | --- | --- | --- | --- |
| Surface number | Surface type | Radius of curvature | Thickness | Refractive index of material | Fno = 3.825 Conic |
| OBJ | Spherical surface | Infinity | 1000 | | |
| STO | Spherical surface | Infinity | 0.7000 | | |
| S1 | Aspherical surface | 2.8845 | 1.7447 | 1.54 | 0.0027 |
| S2 | Aspherical surface | −8.8131 | 0.5336 | | −60.7924 |
| S3 | Aspherical surface | −3.3654 | 2.4389 | 1.64 | −6.3293 |
| S4 | Aspherical surface | −7.1363 | 0.1270 | | −14.7204 |
| S5 | Aspherical surface | 5.6935 | 2.4483 | 1.54 | −9.5002 |
| S6 | Aspherical surface | 3.7867 | 0.9765 | | 0.2674 |
| S7 | Spherical surface | Infinity | — | | |

It may be seen from Table 11 that in this embodiment, the first lens 310 to the third lens 330 are all plastic aspherical lenses, and each aspherical surface type x is defined by the following formula:

$$x = \frac{ch^2}{1 + \sqrt{1 - (k+1)c^2h^2}} + \sum Aih^i;$$

where x is the vector height of the distance between the position of the aspherical surface at the height h along the optical axis and the vertex of the aspherical surface; c is the paraxial curvature of the aspherical surface, and c=1/R (that is to say, the paraxial curvature c is the reciprocal of the radius R of curvature in Table 11); k is the conic; and Ai is the $i^{th}$-order coefficient of the aspherical surface. Table 12 below shows the high-order coefficients A4, A6, A8, A10, and A12 that may be used for the aspherical surfaces S1 to S6 of the lenses in Embodiment 6.

It should be understood that the aspherical surface of each lens in the imaging assembly 300 may be the aspherical surface shown in the above aspherical surface formula or other aspherical surface formula, which is not limited in the present disclosure.

TABLE 12

| Surface number | A4 | A6 | A8 | A10 | A12 |
| --- | --- | --- | --- | --- | --- |
| S1 | 1.3957589E−03 | −2.0778049E−03 | −1.1285948E−03 | 3.9366903E−04 | 8.1881786E−04 |
| S2 | −2.8571476E−03 | 8.4173003E−04 | −4.8293623E−04 | −2.9142261E−04 | 1.8963005E−04 |
| S3 | −1.4522838E−03 | 4.1351388E−04 | 7.3812347E−04 | −2.0277131E−04 | −9.3829888E−04 |

TABLE 12-continued

| Surface number | A4 | A6 | A8 | A10 | A12 |
|---|---|---|---|---|---|
| S4 | −6.0833705E−04 | 2.5787525E−03 | 2.9587647E−06 | −2.3047151E−04 | −1.0787781E−04 |
| S5 | −1.3540850E−02 | 8.9255118E−04 | −3.2663452E−04 | −1.3204933E−04 | −1.1387187E−04 |
| S6 | −1.9718551E−02 | 4.4003776E−05 | −8.2565953E−05 | −1.1522620E−04 | −2.6666208E−05 |

It may be seen that in combination with the data in Table 11 and Table 12, the imaging assembly in Embodiment 6 satisfies the following relational expressions:

$|f2/f|=2.334$, where f2 is the focal length of the second lens, and f is the focal length of the imaging assembly.

$\Phi11/TTL==0.236$, where $\Phi11$ is the aperture of the image side surface of the first lens, and TTL is the total length of the imaging assembly.

$IH/TTL=0.178$, where IH is the maximum image height of the projected image of the imaging assembly.

$CTmax-CTmin=0.704$, where CTmax is the maximum thickness of each lens, and CTmin is the minimum thickness of each lens.

$f1-f=-1.442$, where f1 is the focal length of the first lens.

$f3-f2=-24.867$, where f3 is the focal length of the third lens.

Figure 12A:
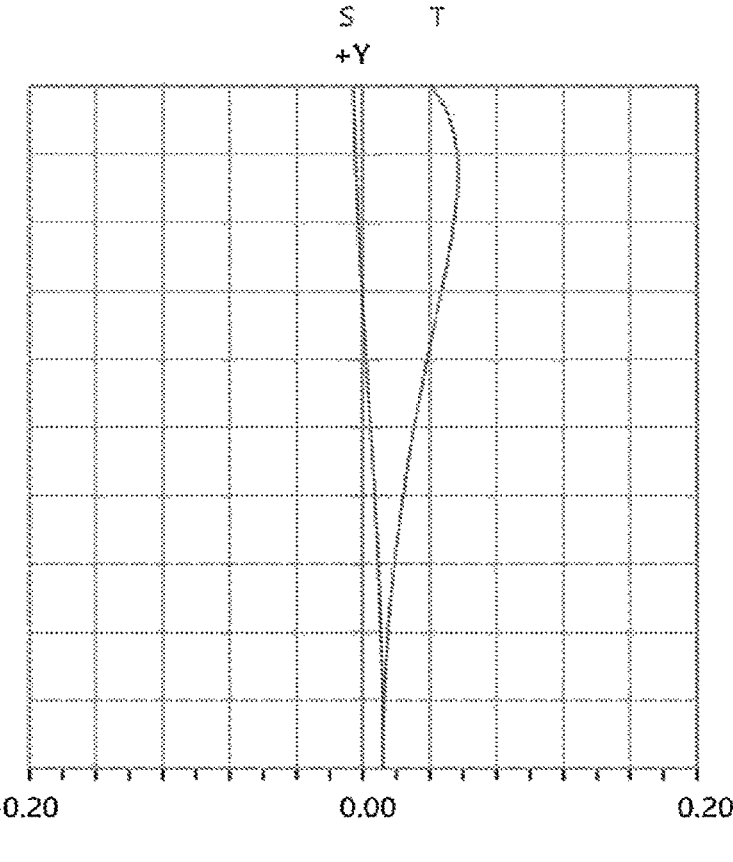
FIG. 12A to FIG. 12F are respectively an astigmatic curve, a distortion curve graph, a grid distortion graph, an MTF curve graph, a relative illumination graph, and a projection imaging graph of the imaging assembly according to the embodiment 6.
Figure 12B:
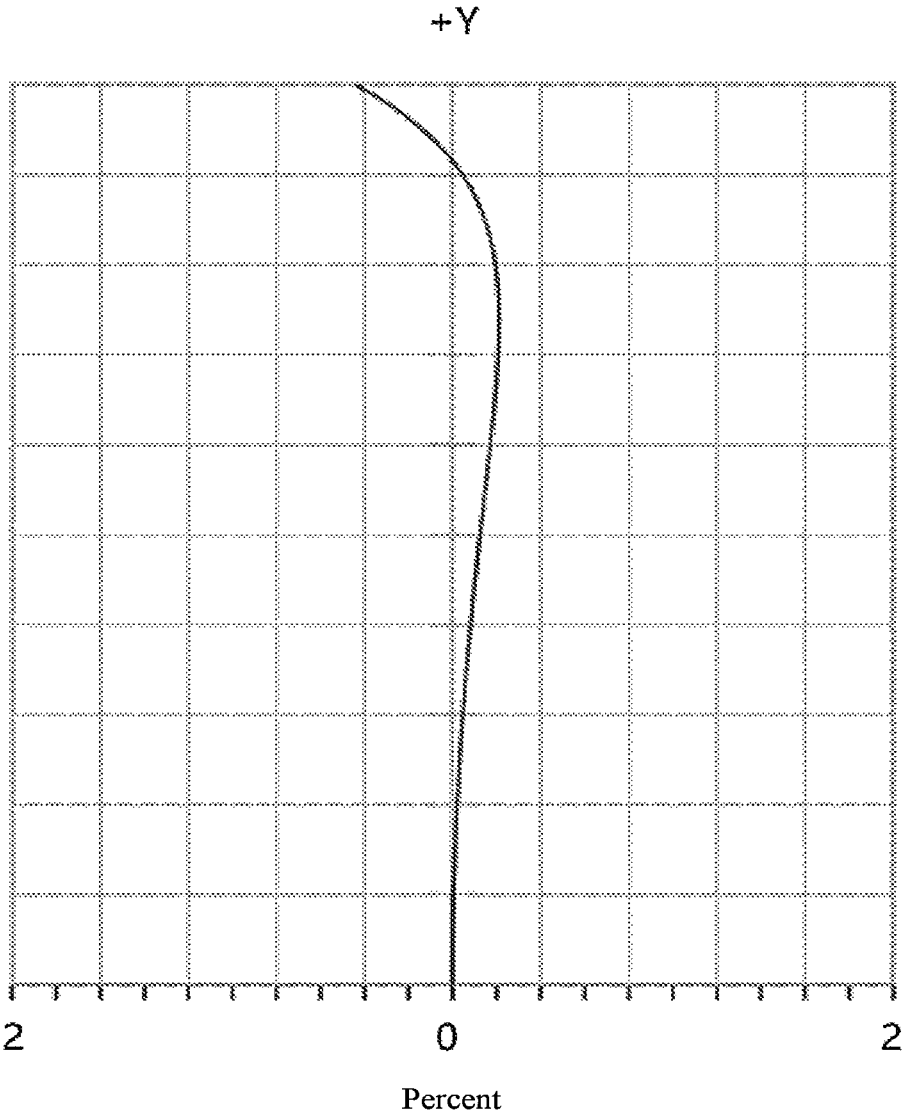
Figure 12C:
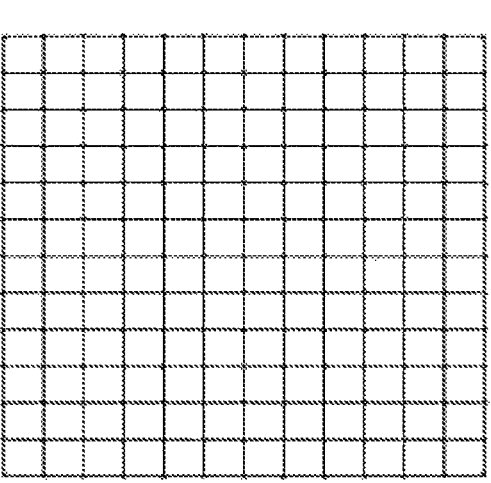
Figure 12D:
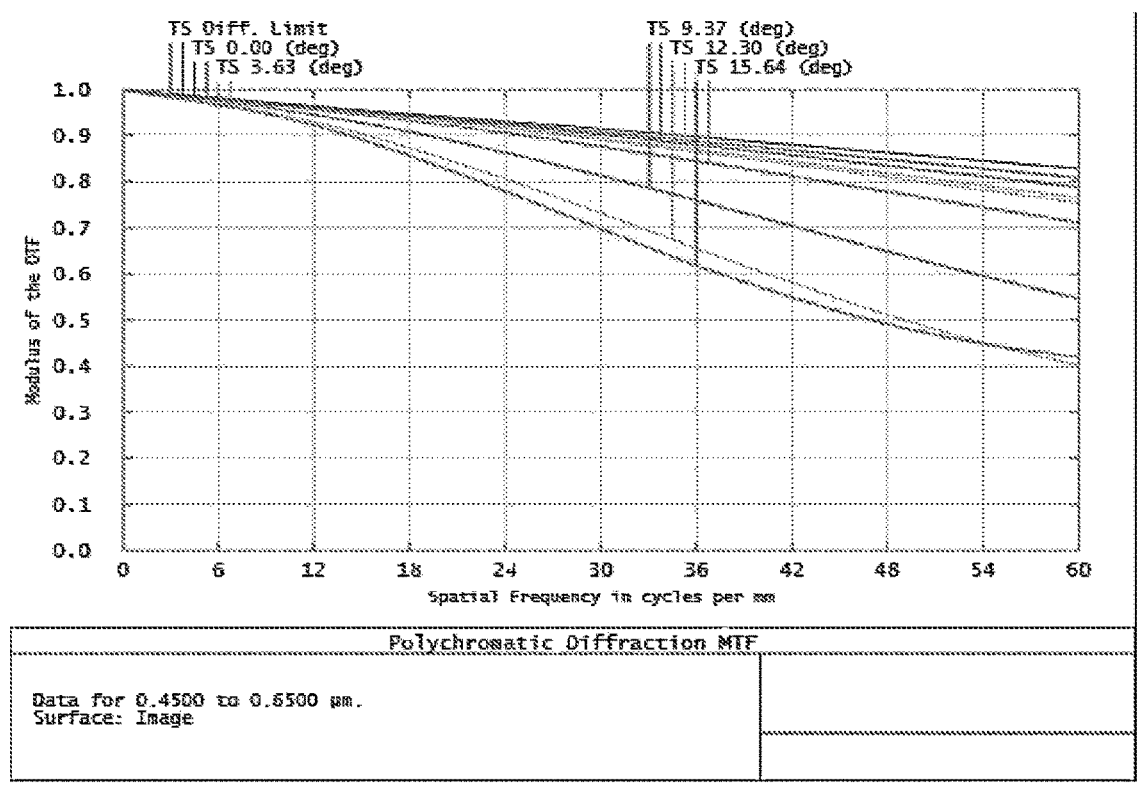
Figure 12E:
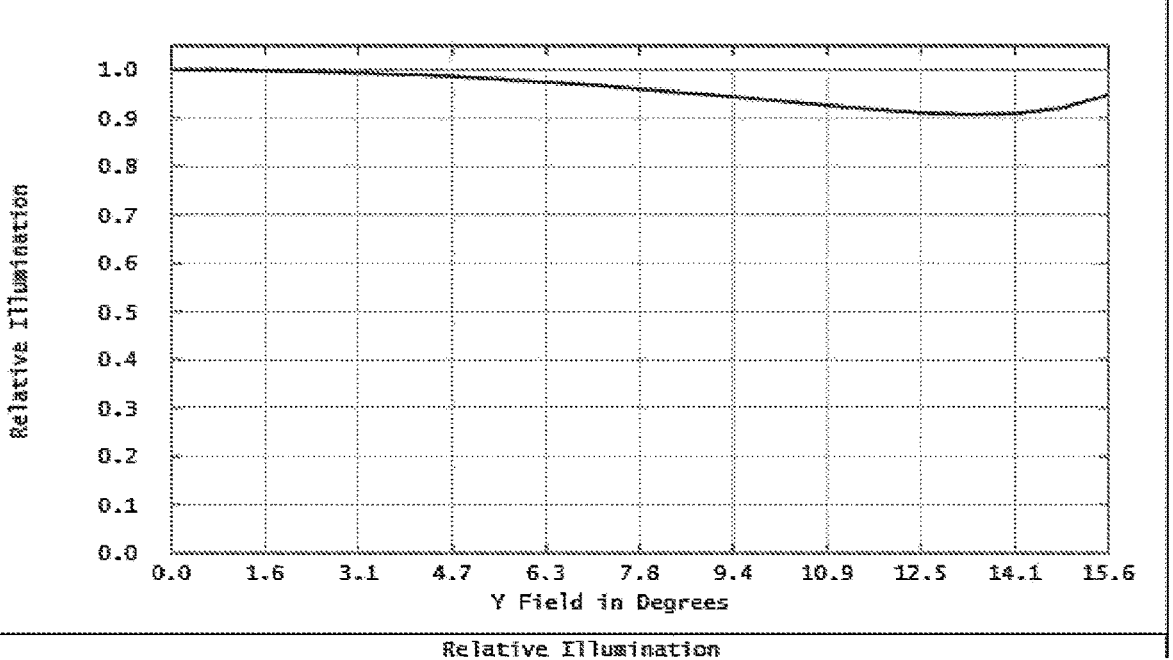
Figure 12F:

FIG. 12A shows the astigmatic curve of the imaging assembly according to Embodiment 6, which represents the bending of the meridian image surface and the sagittal image surface. FIG. 12B shows the distortion curve of the imaging assembly according to Embodiment 6, which represents the percent of distortion at different image heights. FIG. 12C shows the grid distortion of the imaging assembly according to Embodiment 6. FIG. 12D shows the MTF curve of the imaging assembly according to Embodiment 6, where the MTF curve corresponds to the plurality of half diagonal visual field angles, including 0°, 3.63°, 9.37°, 12.30°, and 15.64°. FIG. 12E shows the relative illumination of the projected image of the imaging assembly according to Embodiment 6. According to FIG. 12A to FIG. 12E, the relationship between the focal length of the second lens and the focal length of the system, and the relationship between the aperture of the image side surface of the first lens and the total length of the system are adjusted, that is to say, the values of $|f2/f|$ and $\Phi11/TTL$ are adjusted to ensure the definition of the projected image while achieving the miniaturization of the imaging assembly. Herein, FIG. 12F shows the specific projection imaging effect of the imaging assembly according to Embodiment 6.

The present disclosure relates to an illumination and projection apparatus. In one of embodiments, the illumination and projection apparatus includes a housing, an illumination assembly, and an imaging assembly. The housing has a first accommodating space and a second accommodating space communicating with each other and is further provided with a light inlet and a light outlet. The light inlet correspondingly communicates with the first accommodating space and is arranged corresponding to a light source. The light outlet correspondingly communicates with the first accommodating space. The illumination assembly is clamped in the first accommodating space and is configured to focus light of the light source. The imaging assembly is clamped in the second accommodating space. The imaging assembly is configured to adjust a visual field angle of light imaging, that is to say, the imaging assembly is configured to adjust a range of a projected image. An aperture of the second accommodating space is smaller than an aperture of the first accommodating space. The imaging assembly blocks the light outlet and the illumination assembly blocks the light inlet to insulate an interior of the housing from an external environment, which improves sealing performance of the illumination and projection apparatus. Moreover, the aperture of the second accommodating space is smaller than the aperture of the first accommodating space, the imaging assembly is installed in the second accommodating space, and the illumination assembly is installed in the first accommodating space, which facilitates sequential installation of the imaging assembly and the illumination assembly, and improves convenience of installing the illumination and projection apparatus.

Figure 13:
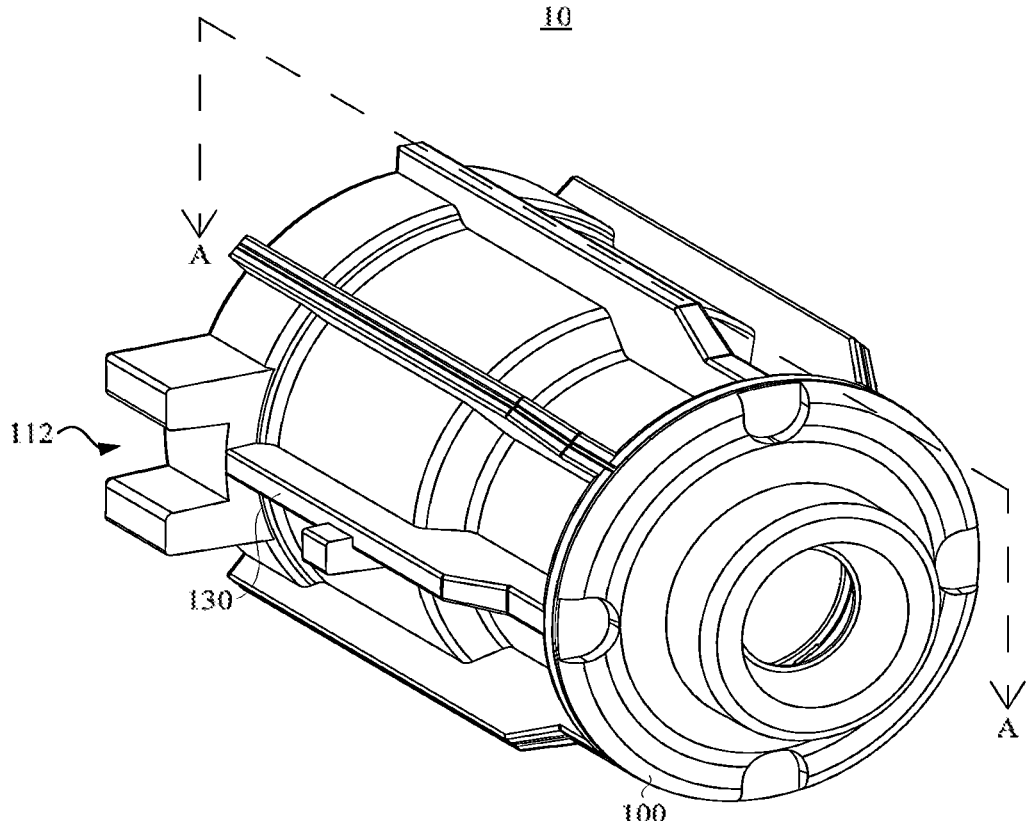
FIG. 13 is a schematic diagram of an illumination and projection apparatus in an embodiment.

Referring to FIG. 13, it is a schematic structural diagram of an illumination and projection apparatus according to an embodiment of the present disclosure.

Figure 14:
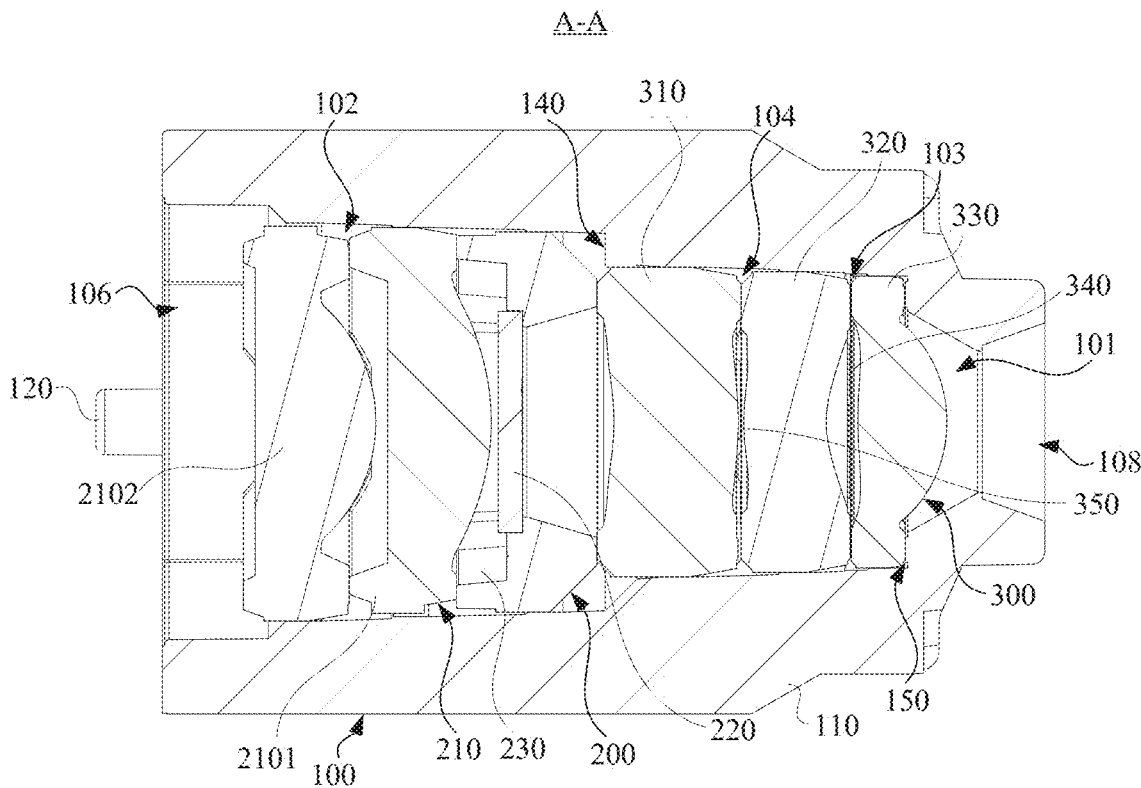
FIG. 14 is a sectional view of the illumination and projection apparatus shown in FIG. 13 along a direction A-A.

The illumination and projection apparatus 10 according to an embodiment includes the housing 100, Referring to FIG. 14 together, the illumination and projection apparatus 10 further includes the illumination assembly 200 and the imaging assembly 300. The housing 100 has the first accommodating space 102 and the second accommodating space 104 communicating with each other, and the housing 100 is further provided with the light inlet 106 and the light outlet 108. The light inlet 106 correspondingly communicates with the first accommodating space 102, and the light inlet 106 is arranged corresponding to the light source. The light outlet 108 correspondingly communicates with the first accommodating space 102. The illumination assembly 200 is clamped in the first accommodating space 102, and the illumination assembly 200 is configured to focus the light of the light source. The imaging assembly 300 is clamped in the second accommodating space 104, and the imaging assembly 300 is configured to adjust the visual field angle of light imaging, that is to say, the imaging assembly 300 is configured to adjust the range of the projected image of the illumination and projection apparatus. The aperture of the second accommodating space 104 is smaller than the aperture of the first accommodating space 102.

In this embodiment, the imaging assembly 300 blocks the light outlet 108 and the illumination assembly 200 blocks the light inlet 106 to insulate the interior of the housing 100 from the external environment, which improves the sealing performance of the illumination and projection apparatus. Moreover, the aperture of the second accommodating space 104 is smaller than the aperture of the first accommodating space 102, the imaging assembly 300 is installed in the second accommodating space 104, and the illumination assembly 200 is installed in the first accommodating space 102, which facilitates the sequential installation of the imaging assembly 300 and the illumination assembly 200, and improves the convenience of installing the illumination and projection apparatus. Herein, the illumination assembly 200 and the imaging assembly 300 sequentially enter the housing 100 through the light inlet 106. For example, the imaging assembly 300 first passes through the light inlet 106 and the first accommodating space 102 in sequence to be finally installed in the second accommodating space 104, and then the illumination assembly 200 is installed in the first accommodating space 102 through the light inlet 106.

In one of embodiments, referring to FIG. 14, an aperture of the light inlet 106 is greater than or equal to the aperture of the first accommodating space 102. In this embodiment, the light inlet 106 corresponds to the external light source, and the light inlet 106 is configured for allowing the light emitted by the external light source to enter the housing 100, that is to say, the light emitted by the external light source arrives at an object side of the illumination assembly 200 through the light inlet 106, which facilitates the illumination assembly 200 to focus the light from the external light source, such that divergent light of the external light source is transmitted to the imaging assembly 300 as focused light. Moreover, the light inlet 106 communicates with the first accommodating space 102 and the second accommodating space 104, the illumination assembly 200 is received in the first accommodating space 102, the imaging assembly 300 is received in the second accommodating space 104, and the imaging assembly 300 and the illumination assembly 200 are sequentially installed in the housing 100 through the light inlet 106, that is to say, the imaging assembly 300 is installed and fixed in the second accommodating space 104 through the light inlet 106, and then the illumination assembly 200 is installed and fixed in the first accommodating space 102 through the light inlet 106. In this way, the light inlet 106 serves as a back-mounted installation hole of the illumination and projection apparatus, that is to say, the imaging assembly 300 and the illumination assembly 200 are installed in the housing 100 in batches through the light inlet 106 in a tail of the housing 100. Moreover, in a case where the aperture of the light inlet 106 is greater than or equal to the aperture of the first accommodating space 102, it is convenient for the imaging assembly 300 and the illumination assembly 200 to pass through, such that the imaging assembly 300 and the illumination assembly 200 are conveniently fixed in the housing 100, thereby further improving the convenience of installing the illumination and projection apparatus.

In one of embodiments, referring to FIG. 14, an aperture of the light outlet 108 is smaller than or equal to the aperture of the second accommodating space 104. In this embodiment, the light outlet 108 corresponds to the imaging assembly 300, the light outlet 108 is positioned on an image side of the imaging assembly 300, the light outlet 108 serves as an imaging light outlet of the illumination and projection apparatus, and the light is finally presented through the light outlet, that is to say, the light outlet 108 serves as a hole corresponding to the light inlet 106 in the illumination and projection apparatus. The aperture of the light outlet 108 is smaller than or equal to the aperture of the second accommodating space 104, which causes the imaging assembly 300 to block the light outlet 108, only allows the light to pass through the light outlet 108, and blocks air in the external environment, such that external water is isolated outside the housing 100, thereby further improving the sealing performance of the illumination and projection apparatus.

In one embodiment, referring to FIG. 14, the imaging assembly 300 includes the first lens 310, the second lens 320, and the third lens 330 arranged in sequence. The first lens 310 is arranged close to the light outlet 108. At least one of the first lens 310 and the second lens 320 is provided with a clamping slot 103. Part of at least one part of the first lens 310 and the second lens 320 is positioned in the clamping slot 103. The third lens 330 is arranged close to the illumination assembly 200. In this embodiment, the first lens 310 and the second lens 320 are connected to each other via the clamping slot 103. For example, the clamping slot 103 is formed in a surface of the first lens 310 close to the second lens 320, and part of the second lens 320 is positioned in the clamping slot 103, such that the second lens 320 and the first lens 310 are clamped to each other, which facilitates modular assembly of the first lens 310 and the second lens 320, thereby facilitating rapid installation of the imaging assembly 300. Herein, the third lens 330 as an initial imaging lens of the imaging assembly 300 is configured to adjust an initial image of the light emitted by the illumination assembly 200, so as to facilitate subsequent adjustment of the visual field angle and definition of the light. In another embodiment, the third lens 330 is also connected to the second lens 320 in the above clamped manner, and a specific structure thereof is similar to a clamping structure between the second lens 320 and the first lens 310. For example, a mortise and tenon structure is used for connection, which will not be repeated here.

Further, the imaging assembly further includes a first spacer 340, the first spacer 340 is positioned between the first lens and the second lens, and the first spacer 340 respectively abuts against the first lens and the second lens. In this embodiment, the first spacer 340 separates the first lens from the second lens. That is to say, a surface of the first spacer 340 abuts against the first lens, and the other surface of the first spacer 340 abuts against the second lens. In other words, the first lens and the second lens are respectively positioned at two opposite surfaces of the first spacer 340. The first lens and the second lens are in clamped connection with each other. In addition to contact at the clamped connection position, the first spacer 340 separates other positions that may be directly contacted to reduce an area of contact between the first lens and the second lens, thereby reducing frictional damage between the first lens and the second lens, and prolonging service life of the imaging assembly.

Furthermore, the imaging assembly includes a second spacer 350, the second spacer 350 is positioned between the second lens and the third lens, and the second spacer 350 respectively abuts against the second lens and the third lens. In this embodiment, the second spacer 350 separates the second lens from the third lens. That is to say, a surface of the second spacer 350 abuts against the second lens, and the other surface of the second spacer 350 abuts against the third lens. In other words, the second lens and the third lens are respectively positioned on two opposite surfaces of the second spacer 350. There is contact between the second lens and the third lens, such that the third lens can support the second lens on the first lens. The second spacer 350 separates positions where the second lens and the third lens may be directly contacted to reduce an area of contact between the second lens and the third lens, thereby reducing frictional damage between the second lens and the third lens, and further prolonging the service life of the imaging assembly.

In one of embodiments, referring to FIG. 14, the housing 100 includes a housing body 110 and two clamping posts 120. The two clamping posts 120 are connected to the housing body 110. The two clamping posts 120 are arranged adjacent to the light inlet 106. The two clamping posts 120 are configured to be connected to a lamp bracket. In this embodiment, the housing body 110 serves as a protective shell of the imaging assembly 300 and the illumination assembly 200 to isolate the imaging assembly 300 and the illumination assembly 200 from the external environment. The clamping posts 120 are positioned at a tail of the housing body 110. The two clamping posts 120 are configured to be connected to the lamp bracket, that is to say, the two clamping posts 120 are configured to fix the housing body 110 on the lamp bracket, and the two clamping posts 120 are oppositely arranged to improve the installation stability of the housing body 110 on the lamp bracket.

Further, referring to FIG. 13 and FIG. 14, the housing body 110 is provided with a directional slot 112. The directional slot 112 is arranged corresponding to one of the clamping posts 120, and the directional slot 112 is configured to receive part of the lamp bracket. In this embodiment, part of the lamp bracket is received in the directional slot 112, such that the housing body 110 is conveniently fixed to the lamp bracket, thereby improving the stability of connection between the illumination and projection apparatus and the lamp bracket. In addition, the directional slot 112 is arranged corresponding to one of the clamping posts 120. The position of the directional slot 112 on the housing body 110 facilitates determination of a placement direction of the two clamping posts 120, such that an installation direction of the illumination and projection apparatus on the lamp bracket can be conveniently determined, and thus the illumination and projection apparatus can be rapidly installed on the lamp bracket.

Furthermore, referring to FIG. 13, an optical axis of the imaging assembly 300 coincides with an optical axis of the illumination assembly 200. The housing 100 further includes an installation guide convex strip 130. The installation guide convex strip 130 is connected to the housing 110. An extension direction of the installation guide convex strip 130 is parallel to the optical axis of the imaging assembly 300. The installation guide convex strip 130 is received in a guide slot on the lamp bracket. In this embodiment, the installation guide convex strip 130 is configured to be connected to the lamp bracket, that is to say, the installation guide convex strip 130 slides in the guide slot to facilitate sliding installation of the illumination and projection apparatus on the lamp bracket. Moreover, the extension direction of the installation guide convex strip 130 is parallel to the optical axis of the imaging assembly 300. In a case where the optical axis of the imaging assembly 300 coincides with the optical axis of the illumination assembly 200, the illumination and projection apparatus always ensures that a light output direction of the illumination and projection apparatus is away from the lamp bracket when installed on the lamp bracket, that is to say, it ensures that an opening direction of the light outlet 108 is away from the lamp bracket, to facilitate light irradiation of the illumination and projection apparatus.

In one of embodiments, the illumination assembly includes a fourth lens 2101 and a fifth lens 2102, the fourth lens 2101 and the fifth lens 2102 are distributed in sequence from an image side to the object side along the optical axis, an object side surface of the fourth lens 2101 is a plane at the optical axis, an image side surface of the fourth lens 2101 is a convex surface at the optical axis, an object side surface of the fifth lens 2102 is a plane at the optical axis, and an image side surface of the fifth lens 2102 is a convex surface at the optical axis. In this embodiment, the fourth lens 2101 and the fifth lens 2102 process the light emitted by the light source to improve the uniformity and brightness of the light passing through the imaging assembly.

In one of embodiments, referring to FIG. 14, the housing 100 has an accommodating space 101, and the accommodating space includes the first accommodating space 102 and the second accommodating space 104. The light inlet 106 and the light outlet 108 are respectively positioned at two ends of the housing 100, the light inlet 106 is arranged corresponding to the light source, and the light outlet 108 is configured for light transmission imaging. The imaging assembly 300 is positioned in the accommodating space 101, and the imaging assembly 300 is arranged close to the light outlet 108. The illumination assembly 200 is positioned in the accommodating space 101, and the illumination assembly 200 includes an illumination lens 210, a film 220, and a film installation bracket 230. The illumination lens 210 is arranged close to the light inlet 106, and the illumination lens 210 is connected to the housing 100. The film installation bracket 230 is positioned on a side of the illumination lens 210 close to the imaging assembly 300, and the film installation bracket 230 is connected to the housing 100. Referring to FIG. 3 together, the film installation bracket 230 is provided with a first accommodating slot 232 and a second accommodating slot 236 communicating with each other. At least part of the film 220 is received in the first accommodating slot 232. The second accommodating slot 236 is configured to receive a first connecting adhesive, so as to block a gap between the film 220 and the film installation bracket 230.

In this embodiment, by injecting the first connecting adhesive into the second accommodating slot 236, on one hand, the stability of connection between the film 220 and the film installation bracket 230 is enhanced, and on the other hand, the gap between the film 220 and the film installation bracket 230 is reduced, which reduces the situation that the air passes through the gap between the film 220 and the film installation bracket 230 to separate the imaging assembly 300 from the illumination lens 210, thereby reducing the formation of water mist on the imaging assembly 300 and the illumination lens 210, and improving the overall sealing performance of the illumination and projection apparatus 10. In another embodiment, the film installation bracket 230 is further provided with a through hole 234. The through hole 234 is configured to be arranged corresponding to the film 220. The first connecting adhesive may also reduce the probability that the air contacts with the illumination lens 210 via the gap between the film 220 and the film installation bracket 230, and the through hole 234. In another embodiment, the illumination lens 210 includes a plurality of planoconvex lenses. A plane of each planoconvex lens is close to the light inlet, that is to say, a convex surface of each planoconvex lens is far away from the light inlet. Moreover, the planoconvex lenses are connected in a clamped manner by using a mortise and tenon structure.

In one of embodiments, referring to FIG. 14, the aperture of the light inlet 106 is greater than or equal to an aperture of the accommodating space 101. In this embodiment, the light inlet 106 serves as a light input window of the housing 100. The light from the external light source enters the housing 100 through the light inlet 106, and the light is easy to focus through optical processing of the illumination lens 210 and the film 220. Moreover, the light inlet 106 serves as an installation port of the housing 100. The imaging assembly 300 and the illumination assembly 200 are installed in the housing 100 via the light inlet 106, that is to say, the imaging assembly 300 and the illumination assembly 200 sequentially enter the accommodating space 101 via the light inlet 106. The aperture of the light inlet 106 is set to be greater than the aperture of the accommodating space 101, such that the imaging assembly 300 and the illumination assembly 200 can conveniently pass through the light inlet 106, thereby improving the convenience of installing the imaging assembly 300 and the illumination assembly 200.

Further, referring to FIG. 14, the housing 100 has an illumination adhesive dispensing surface 140. The illumination adhesive dispensing surface 140 is positioned at aperture change positions of the light inlet 106 and the accommodating space 101. The illumination adhesive dispensing surface 140 is configured to bear a second connecting adhesive, so as to block a gap between the illumination lens 210 and the housing 100. In this embodiment, the illumination adhesive dispensing surface 140 is positioned in the accommodating space 101 and at the aperture change positions of the light inlet 106 and the accommodating space 101, that is to say, the illumination adhesive dispensing surface 140 is positioned on a step that is formed at a junction of the light inlet 106 and the accommodating space 101 because the aperture of the light inlet 106 is larger than the aperture of the accommodating space 101. In this way, when the illumination lens 210 is installed in the accommodating space 101, for example, the illumination lens 210 is arranged adjacent to the illumination adhesive dispensing surface 140, the second connecting adhesive is arranged on the illumination adhesive dispensing surface 140. Under the fluid action of the second connecting adhesive, the illumination lens 210 is connected to the illumination adhesive dispensing surface 140, such that the illumination lens 210 is fixed to the housing 100 via the second connecting adhesive; and moreover, the second connecting adhesive blocks the gap between the illumination lens 210 and the housing 100 to reduce the gap between the illumination lens 210 and the housing 100, such that the probability that the outside air contacts with the film 220 via the light inlet 106 and the gap between the illumination lens 210 and the housing 100 is effectively reduced, and the sealing performance of the illumination and projection apparatus 10 is further improved.

In one of embodiments, reaming to FIG. 14, the aperture of the light outlet 108 is smaller than the aperture of the accommodating space 101. In this embodiment, the light outlet 108 serves as a light output window of the housing 100, the light outlet 108 corresponds to the imaging assembly 300, and the imaging assembly 300 is arranged at a position of the accommodating space 101 close to the light outlet 108. The aperture of the light outlet 108 is set to be smaller than the aperture of the accommodating space 101, such that on one hand, the imaging assembly 300 is prevented from falling off from the housing 100, and on the other hand, the light outlet 108 is blocked by the imaging assembly 300, thereby improving the sealing performance of the illumination and projection apparatus 10.

Further, referring to FIG. 14, the housing 100 has an imaging adhesive dispensing surface 150. The imaging adhesive dispensing surface 150 is positioned at aperture change positions of the light outlet 108 and the accommodating space 101. The imaging adhesive dispensing surface 150 is configured to bear a third connecting adhesive, so as to block a gap between the imaging assembly 300 and the housing 100. In this embodiment, the imaging adhesive dispensing surface 150 is positioned in the accommodating space 101 and at the aperture change positions of the light outlet 108 and the accommodating space 101, that is to say, the imaging adhesive dispensing surface 150 is positioned on a step that is formed at a junction of the light outlet 108 and the accommodating space 101 because the aperture of the light outlet 108 is smaller than the aperture of the accommodating space 101. In this way when the imaging assembly 300 is installed in the accommodating space 101, for example, the imaging assembly 300 is arranged adjacent to the imaging adhesive dispensing surface 150, the third connecting adhesive is arranged on the imaging adhesive dispensing surface 150. Under the fluid action of the third connecting adhesive, the imaging assembly 300 is connected to the imaging adhesive dispensing surface 150, such that the imaging assembly 300 is fixed to the housing 100 via the third connecting adhesive; and moreover, the third connecting adhesive blocks the gap between the imaging assembly 300 and the housing 100 to reduce the gap between the imaging assembly 300 and the housing 100, such that the probability that the outside air contacts with the film 220 via the light outlet 108 and the gap between the imaging assembly 300 and the housing 100 is effectively reduced, and the sealing performance of the illumination and projection apparatus 10 is further improved. Herein, the first connecting adhesive, the second connecting adhesive, and the third connecting adhesive are curing adhesives, which is convenient to enhance the connection strength and sealing performance between connecting parts.

Figure 16:
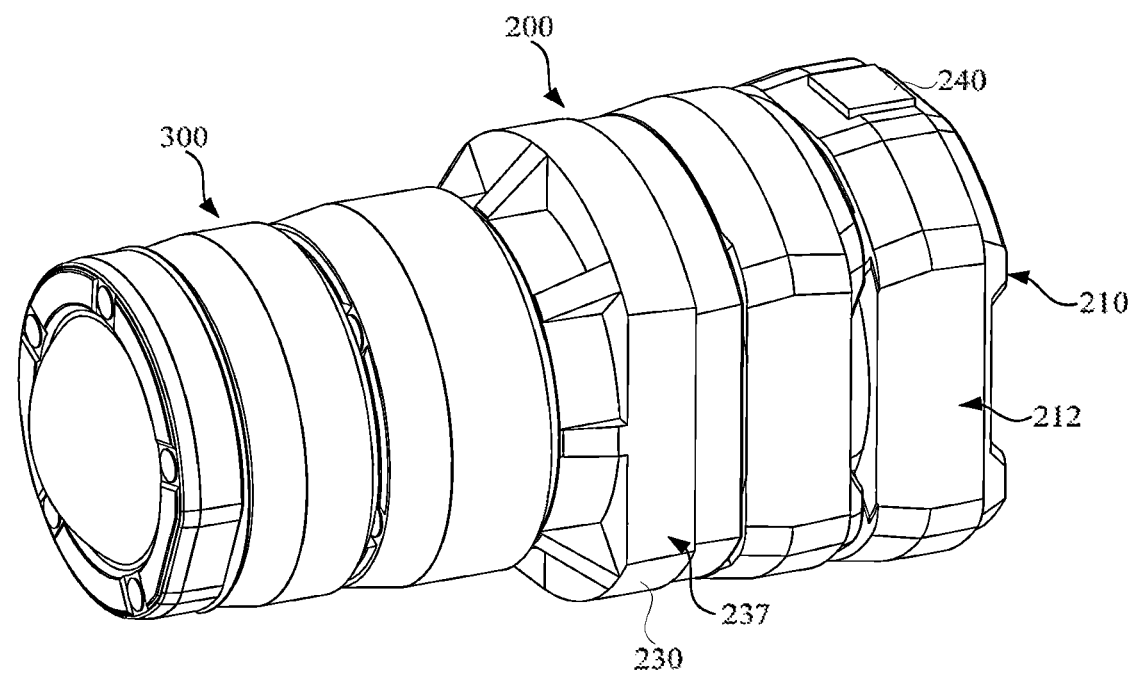
FIG. 16 is a schematic connection diagram of an illumination assembly and an imaging assembly in the illumination and projection apparatus shown in FIG. 13.

In one of embodiments, referring to FIG. 16. The film installation bracket 230 has a first stabilizing plane 237, the first stabilizing plane 237 is positioned on a side edge of the film installation bracket 230, and the first stabilizing plane 237 is flush with and abuts against an inner wall of the accommodating space 101. In this embodiment, the side edge of the film installation bracket 230 abuts against an inner wall of the accommodating hole, that is to say, the inner wall of the accommodating space 101 clamps the film installation bracket 230 in a radial direction, while the first stabilizing plane 237 serves as an edge plane of the film installation bracket 230, and the first stabilizing plane 237 is parallel to a tangential plane of an edge of the film installation bracket 230. In this way, when the film installation bracket 230 abuts against the inner wall of the accommodating space 101, the first stabilizing plane 237 is flush with the inner wall of the accommodating space 101, which reduces the trend for rotation of the film installation bracket 230 in the accommodating space 101, improves the installation stability of the film installation bracket 230 in the housing 100, and avoids random rotation of the film 220.

In one of embodiments, referring to FIG. 16, the illumination lens 210 has a second stabilizing plane 212, the second stabilizing plane 212 is positioned on a side edge of the illumination lens 210, and the second stabilizing plane 212 is flush with and abuts against the inner wall of the accommodating space 101. In this embodiment, the side edge of the illumination lens 210 abuts against the inner wall of the accommodating hole, that is to say, the inner wall of the accommodating space 101 clamps the illumination lens 210 in the radial direction, while the second stabilizing plane 212 serves as an edge plane of the illumination lens 210, and the second stabilizing plane 212 is parallel to a tangential plane of an edge of the illumination lens 210. In this way, when the illumination lens 210 abuts against the inner wall of the accommodating space 101, the second stabilizing plane 212 is flush with the inner wall of the accommodating space 101, which reduces the trend for rotation of the illumination lens 210 in the accommodating space 101, and improves the installation stability of the illumination lens 210 in the housing 100.

In one of embodiments, referring to FIG. 16, the illumination assembly 200 further includes a stabilizing protrusion 240 connected to the illumination lens 210, the stabilizing protrusion 240 is positioned on the side edge of the illumination lens 210, and the stabilizing protrusion 240 abuts against the inner wall of the accommodating space 101. In this embodiment, the stabilizing protrusion 240 is positioned in the accommodating space 101, and the stabilizing protrusion 240 is connected to the side edge of the illumination lens 210. When the illumination lens 210 is installed in the housing 100, the stabilizing protrusion 240 is positioned between the illumination lens 210 and an inner wall of the housing 100, that is to say, the stabilizing protrusion 240 respectively abuts against the side edge of the illumination lens 210 and the inner wall of the housing 100, and in other words, the stabilizing protrusion 240 is filled between the side edge of the illumination lens 210 and the inner wall of the housing 100, such that the illumination lens 210 is stably fixed in the accommodating space 101, thereby improving the installation stability of the illumination lens 210 in the housing 100.

In one of embodiments, the illumination assembly further includes an illumination spacer, the illumination spacer is positioned between the film installation bracket and the illumination lens, and the illumination spacer respectively abuts against the film installation bracket and the illumination lens. In this embodiment, the illumination spacer serves as a separator between the film installation bracket and the illumination lens. The illumination spacer is configured to separate the film installation bracket from the illumination lens, which reduces an area of contact between the illumination lens and the film installation bracket, thereby reducing the probability of damage to the illumination lens, that is, the probability that a surface of the illumination lens is scratched by the film installation bracket.

In one of embodiments, the present disclosure further provides a vehicle-mounted ground lamp, including the illumination and projection apparatus described in any one of the above embodiments. In this embodiment, the illumination and projection apparatus includes the housing, the illumination assembly, and the imaging assembly. The housing has the accommodating space and is further provided with the light inlet and the light outlet that communicate with the accommodating space. The light inlet and the light outlet are respectively positioned at the two ends of the housing, the light inlet is arranged corresponding to the light source, and the light outlet is configured for light transmission imaging. The imaging assembly is positioned in the accommodating space and is arranged close to the light outlet. The illumination assembly is positioned in the accommodating space and includes the illumination lens, the film, and the film installation bracket. The illumination lens is arranged close to the light inlet and is connected to the housing. The film installation bracket is positioned on a side of the illumination lens close to the imaging assembly, and the film installation bracket is connected to the housing and is provided with the first accommodating slot and the second accommodating slot communicating with each other. At least part of the film is received in the first accommodating slot. The second accommodating slot is configured to receive the first connecting adhesive, so as to block the gap between the film and the film installation bracket. By injecting the first connecting adhesive into the second accommodating slot, on one hand, the stability of connection between the film and the film installation bracket is enhanced, and on the other hand, the gap between the film and the film installation bracket is reduced, which reduces the situation that the air passes through the gap between film and the film installation bracket to separate the imaging assembly from the illumination lens, thereby reducing the formation of the water mist on the imaging assembly and the illumination lens, and improving the overall sealing performance of the illumination and projection apparatus.

Figure 15:
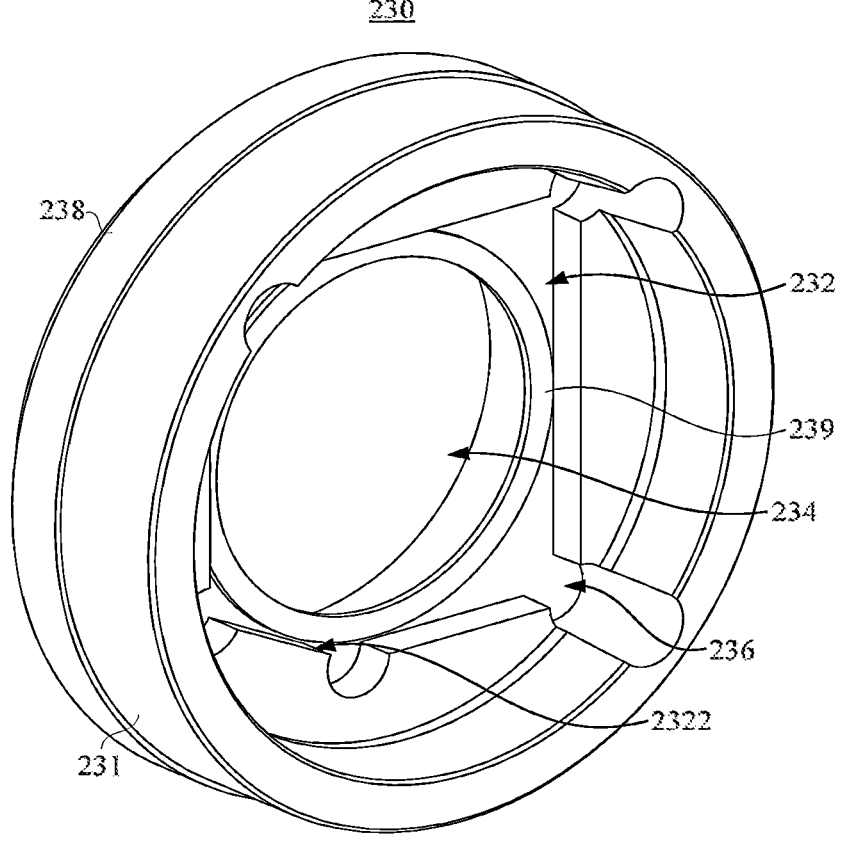
FIG. 15 is a schematic diagram of a film installation bracket of the illumination and projection apparatus shown in FIG. 13.

In one of embodiments, the present disclosure further provides a film installation bracket. Referring to FIG. 15, it is a schematic structural diagram of a film installation bracket according to an embodiment of the present disclosure.

The film installation bracket 230 according to an embodiment is provided with a residue accommodating space 232. The residue accommodating space 232 is configured to receive at least part of the film, and the residue accommodating space 232 is further configured to receive edge residues of the film. The film installation bracket 230 is further provided with the through hole 234. The through hole 234 is configured to be arranged corresponding to the film.

In this embodiment, when the film is installed on the film installation bracket 230, the residues on the film falls into the residue accommodating space 232, that is to say, the residue accommodating space 232 is configured to collect the residues and is convenient to collect the edge residues on the film, which reduces the probability that the residues fall out via the through hole 234, thereby reducing impact of the residues on the film on imaging of the lens, and reducing black spots of the image. Herein, the residue accommodating space is the first accommodating slot.

In one of embodiments, referring to FIG. 15, the film installation bracket 230 is further provided with an avoidance slot 236, the avoidance slot 236 communicates with the residue accommodating space 232, and the avoidance slot 236 is configured to receive a top corner of the film. In this embodiment, the avoidance slot 236 serves as an extension space of the residue accommodating space 232, that is to say, the avoidance slot 236 extends outwards relative to the residue accommodating space 232, and in other words, the avoidance slot 236 is positioned at a position where the residue accommodating space 232 is far away from the through hole 234, such that the avoidance slot 236 can also expand a part of accommodating space outwards in a case where it communicates with the residue accommodating space 232. In this way, in a case where the avoidance slot 236 corresponds to the top corner of the film, when the film is installed in the residue accommodating space 232, the top corner of the film correspondingly extends into the avoidance slot 236 to provide an avoidance space for the top corner of the film, which reduces the probability of damage to the top corner of the film due to collision with the residue accommodating space 232, and is also convenient to quickly install the film in the residue accommodating space 232. Herein, the avoidance slot is the second accommodating slot, and may not only play a role of avoidance, but also serve as a groove for accommodating glue.

In one of embodiments, referring to FIG. 15, the film installation bracket 230 includes a bracket body 238 and a residue accommodating ring 239 connected to each other. A middle opening of the residue accommodating ring 239 is arranged opposite to the through hole 234. The residue accommodating ring 239 forms the residue accommodating space 232 with an inner wall of the bracket body 238. The residue accommodating ring 239 is further configured to abut against the film. In this embodiment, the bracket body 238 is provided with a residue accommodating groove, at least part of the film is positioned in the residue accommodating groove, the residue accommodating ring 239 is positioned at a bottom of the residue accommodating groove, and the residue accommodating ring 239 is configured to support the film, that is to say, the residue accommodating ring 239 is positioned between the bottom of the residue accommodating groove and the film. The residue accommodating ring 239 protrudes from the bottom of the residue accommodating groove, such that the residue accommodating space 232 is formed between the residue accommodating ring 239 and a side wall of the residue accommodating groove. In this way, when the film is installed on the film installation bracket 230, the residue accommodating ring 239 properly jacks up the film, such that the film is far away from the bottom of the residue accommodating groove, that is to say, the film does not contact with the bottom of the residue accommodating groove, which is convenient to receive the edge residues of the film in the residue accommodating space 232.

Further, referring to FIG. 15, an aperture of the middle opening of the residue accommodating ring 239 is greater than or equal to an aperture of the through hole 234. In this embodiment, the residue accommodating ring 239 forms the residue accommodating space 232 with the inner wall of the bracket body 238, that is to say, the residue accommodating ring 239 serves as one forming part of the residue accommodating space 232, and in other words, the residue accommodating ring 239 serves as one side wall of the residue accommodating space 232 close to the through hole 234. To reduce impact on light transmission of the through hole 234, the aperture of the middle opening of the residue accommodating ring 239 is set to be greater than or equal to the aperture of the through hole 234. The residue accommodating ring 239 has a structure that a middle thereof is hollow, that is to say, the residue accommodating ring 239 is of an annular structure with a hollow middle, such that an area of overlap between a projection of the residue accommodating ring 239 on the film installation bracket 230 and the through hole 234 is 0, the residue accommodating ring 239 does not block the through hole 234, and the aperture of the through hole 234 is large enough to increase an area of the light passing through the film.

Furthermore, referring to FIG. 15, the film installation bracket 230 includes a first support ring 231, the first support ring 231 is connected to the bracket body 238, and the first support ring 231 is configured to support the illumination lens. In this embodiment, the first support ring 231 serves as an extension part of the bracket body 238, that is to say, the first support ring 231 serves as a part protruding from the bracket body 238. A side of the first support ring 231 away from the bracket body 238 is configured for abutting against the illumination lens. During assembly of the lens, the first support ring 231 is positioned between the bracket body 238 and the illumination lens. The first support ring 231 separates the illumination lens from the film, which reduces collision between the illumination lens and the film, and ensures normal use of the illumination lens and the film.

Figure 17:
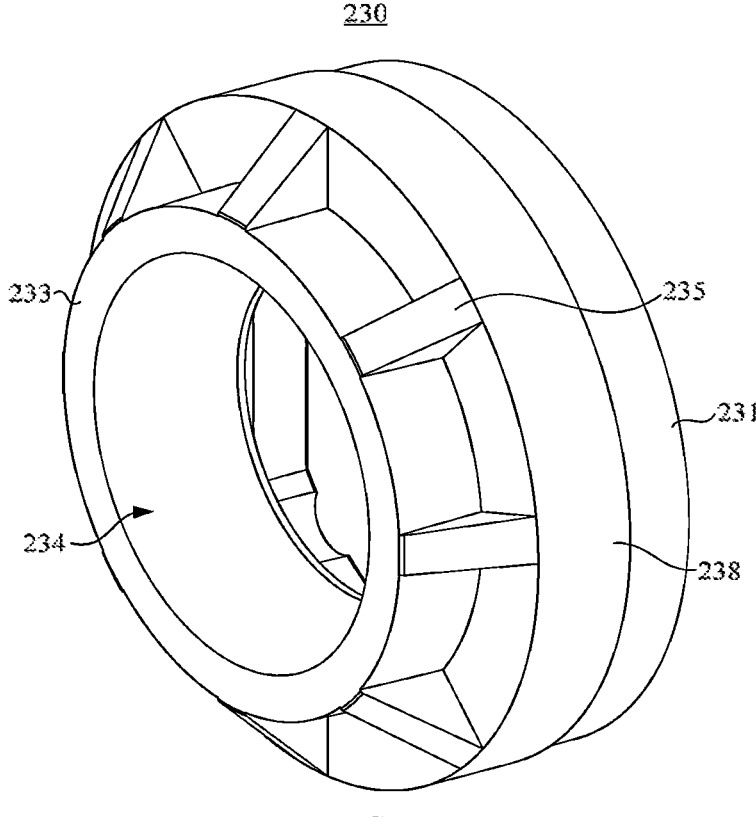
FIG. 17 is another schematic diagram of the film installation bracket shown in FIG. 15.

Furthermore, referring to FIG. 17, the film installation bracket 230 includes a second support ring 233, the second support ring 233 is arranged opposite to the first support ring 231, the second support ring 233 is connected to the bracket body 238, and the second support ring 233 is configured to abut against the imaging lens. In this embodiment, the second support ring 233 and the first support ring 231 are simultaneously connected to the bracket body 238, and the second support ring 233 and the first support ring 231 are symmetrically arranged, that is to say, the second support ring 233 and the first support ring 231 are symmetrically arranged with the bracket body 238 as a center, and in other words, the second support ring 233 is positioned on a side of the bracket body 238 away from the first support ring 231. The illumination lens and the imaging lens are respectively arranged on the two sides of the bracket body 238. The first support ring 231 is configured to abut against the illumination lens, while the second support ring 233 is configured to abut against the imaging lens, such that the illumination lens and the imaging lens can be conveniently arranged away from the bracket body 238. The illumination lens and the imaging lens are separated from the film while being supported, which reduces rigid extrusion between the film and the illumination lens and between the film and the imaging lens, thereby reducing the probability of damage to the film, the illumination lens, and the imaging lens, and further ensuring the normal use of the film, the illumination lens, and the imaging lens.

Furthermore, referring to FIG. 17, the film installation bracket 230 includes a plurality of clamping protrusions 235, the plurality of clamping protrusions 235 are connected to the second support ring 233 to form a plurality of grooves, and the grooves are configured to receive part of the housing. In this embodiment, each of the clamping protrusions 235 is connected to the second support ring 233, and a gap between the two adjacent clamping protrusions 235 forms the groove with the second support ring 233. The groove serves as an installation gap of the second support ring 233, such that part of the housing can be conveniently clamped in the groove, and the film installation bracket 230 can be conveniently fixed to the housing. Herein, the housing is an external protective part of the film installation bracket 230, that is to say, the film installation bracket 230 is configured to install the film in the housing.

In one of embodiments, referring to FIG. 15, the residue accommodating space 232 has a directional slope 2322, the directional slope 2322 is positioned between any two inner walls of the residue accommodating space 232, and the directional slope 2322 is inclined to the adjacent inner wall of the residue accommodating space 232. In this embodiment, the directional slope 2322 is a part of the inner wall of the residue accommodating space 232, that is to say, the directional slope 2322 serves as one inner wall of the residue accommodating space 232. The directional slope 2322 is inclined to other inner walls of the residue accommodating space 232, for example, an angle formed between the directional slope 2322 and the adjacent inner wall of the residue accommodating space 232 is not 90°, and the other adjacent side walls of the residue accommodating space 232 are perpendicular to each other. In this way, during installation of the film, it is convenient to determine front and back surfaces of the film in the residue accommodating space 232 according to an inclination direction of the directional slope 2322, such that the film can be conveniently correctly installed on the film installation bracket 230.

In one of embodiments, referring to FIG. 15, the aperture of the through hole 234 gradually increases in a direction away from the residue accommodating space 232. In this embodiment, the through hole 234 corresponds to the film, and the through hole 234 is configured for light transmission, so as to project a pattern on the film. The aperture of the through hole 234 is designed to increase, such that more light can conveniently pass through the through hole 234 to adjust a size of the projected image to meet image size requirements of different projected images, thereby improving the adaptability of the projected image.

In one of embodiments, the present disclosure further provides an illumination lamp, including the film and the film installation bracket described in any one of the above embodiments. The at least part of the film is positioned in the residue accommodating space. In this embodiment, the film installation bracket is provided with the residue accommodating space. The residue accommodating space is configured to receive the at least part of the film and is further configured to receive the edge residues of the film. The film installation bracket is further provided with the through hole. The through hole is configured to be arranged corresponding to the film. When the film is installed on the film installation bracket, the residues on the film falls into the residue accommodating space, that is to say, the residue accommodating space is configured to collect the residues and is convenient to collect the edge residues on the film, which reduces the probability that the residues fall out via the through hole, thereby reducing the impact of the residues on the film on the imaging of the lens, and reducing the black spots of the image.

In one of embodiments, the present disclosure further provides a courtesy lamp, including the illumination and projection apparatus described in any one of the above embodiments. In one of embodiments, the illumination and projection apparatus includes the housing, the illumination assembly, and the imaging assembly. The housing has the first accommodating space and the second accommodating space communicating with each other and is further provided with the light inlet and the light outlet. The light inlet correspondingly communicates with the first accommodating space and is arranged corresponding to the light source. The light outlet correspondingly communicates with the first accommodating space. The illumination assembly is clamped in the first accommodating space and is configured to focus the light of the light source. The imaging assembly is clamped in the second accommodating space and is configured to adjust the visual field angle of light imaging. The aperture of the second accommodating space is smaller than the aperture of the first accommodating space. The imaging assembly blocks the light outlet and the illumination assembly blocks the light inlet to insulate the interior of the housing from the external environment, which improves the sealing performance of the illumination and projection apparatus. Moreover, the aperture of the second accommodating space is smaller than the aperture of the first accommodating space, the imaging assembly is installed in the second accommodating space, and the illumination assembly is installed in the first accommodating space, which facilitates the sequential installation of the imaging assembly and the illumination assembly, and improves the convenience of installing the illumination and projection apparatus.

In addition, the size of the image projected by the courtesy lamp will vary with different vertical heights of the courtesy lamp from the ground and different placement angles of the courtesy lamp. The technical solutions of different sizes of projected images due to different vertical heights of the courtesy lamp from the ground and different placement angles of the courtesy lamp belong to the content of protection of the present disclosure.

The present disclosure is described with the preferred embodiments. Those skilled in the art know that these features and embodiments may be changed or substituted equivalently without departing from the spirit and scope of the present disclosure. The present disclosure is not limited by the specific embodiments disclosed herein, and other embodiments falling within the claims of the present disclosure fall within the scope of protection of the present disclosure.

What is claimed is:

1. An imaging assembly for a projection apparatus, along an optical axis and from an image side to an object side, sequentially comprising:

a first lens (310) having an image side surface and an object side surface, wherein a total of radius of curvature of the image side surface and the object side surface of the first lens (310) is less than zero;

a second lens (320), an object side surface of the second lens (320) being a convex surface at the optical axis, an image side surface of the second lens (320) being a concave surface at the optical axis, wherein a total of radius of curvature of the image side surface and the object side surface of the second lens (320) is less than zero; and a third lens (330) having an image side surface and an object side surface, wherein a total of radius of curvature of the image side surface and the object side surface of the third lens (330) is greater than zero;

the imaging assembly satisfying the following relational expressions:

$$0.9<|f2/f|<2.4 \text{ and } 0.23<\Phi11/TTL<0.45;$$

wherein f2 is a focal length of the second lens, f is a focal length of the imaging assembly, $\Phi11$ is an aperture of the image side surface of the first lens, and TTL is a total length of the imaging assembly;

wherein the imaging assembly further satisfies the following relational expression:

$$8 \text{ mm}<TTL<12.1 \text{ mm; and}$$

wherein the imaging assembly satisfies the following relational expression:

$-3.8<f1f-f<-1.4$, wherein f1 is a focal length of the first lens.

2. The imaging assembly according to claim 1, wherein the imaging assembly satisfies the following relational expression:

$$0.17<IH/TTL<0.22;$$

wherein IH is a maximum image height of a projected image of the imaging assembly.

3. The imaging assembly according to claim 1, wherein the imaging assembly satisfies the following relational expression:

$$0.55<CTmax-CTmin<1.8;$$

wherein CTmax is a maximum thickness of each of the lenses, and CTmin is a minimum thickness of each of the lenses.

4. The imaging assembly according to claim 1, wherein the imaging assembly satisfies the following relational expression:

$$-31<f3-f2<-4.5;$$

wherein f3 is a focal length of the third lens.

5. An illumination and projection apparatus, comprising:

the imaging assembly (300) according to claim 1;

a housing (100), the housing (100) having a first accommodating space (102) and a second accommodating space (104) communicating with each other, the housing (100) being further provided with a light inlet (106) and a light outlet (108), the light inlet (106) communicating with the first accommodating space (102), the light inlet (106) being arranged corresponding to a light source, the light outlet (108) communicating with the first accommodating space (102); and an illumination assembly (200), the illumination assembly (200) being clamped in the first accommodating space (102) and being configured to focus light of the light source;

wherein the imaging assembly (300) is clamped in the second accommodating space (104), the imaging assembly (300) is configured to adjust a visual field angle of light imaging, and an aperture of the second accommodating space (104) is smaller than an aperture of the first accommodating space (102).

6. The illumination and projection apparatus according to claim 5, wherein an aperture of the light inlet (106) is greater than or equal to the aperture of the first accommodating space (102).

7. The illumination and projection apparatus according to claim 5, wherein an aperture of the light outlet (108) is smaller than or equal to the aperture of the second accommodating space (104).

8. The illumination and projection apparatus according to claim 5, wherein the first lens (310) is arranged close to the light outlet (108), at least one of the first lens (310) and the second lens (320) is provided with a clamping slot (103), part of at least one of the first lens (310) and the second lens (320) is positioned in the clamping slot (103), and the third lens (330) is arranged close to the illumination assembly (200).

9. The illumination and projection apparatus according to claim 7, wherein the imaging assembly (300) further comprises a first spacer (340), the first spacer (340) is positioned between the first lens (310) and the second lens (320), and the first spacer (340) respectively abuts against the first lens (310) and the second lens (320).

10. The illumination and projection apparatus according to claim 5, wherein the imaging assembly (300) further comprises a spacer (350), the spacer (350) is positioned between the second lens (320) and the third lens (330), and the spacer (350) respectively abuts against the second lens (320) and the third lens (330).

11. The illumination and projection apparatus according to claim 5, wherein the housing (100) comprises a housing body (110) and two clamping posts (120) connected to the housing body (110), the two clamping posts (120) are arranged adjacent to the light inlet (106), and the two clamping posts (120) are configured to be connected to a lamp bracket.

12. The illumination and projection apparatus according to claim 11, wherein the housing (110) is provided with a directional slot (112), the directional slot (112) is arranged corresponding to one of the clamping posts (120), and the directional slot (112) is further configured to receive a part of the lamp bracket.

13. The illumination and projection apparatus according to claim 5, wherein the optical axis of the imaging assembly (300) coincides with an optical axis of the illumination assembly (200), the housing (100) further comprises an installation guide convex strip (130), the installation guide convex strip (130) is connected to the housing body (110), an extension direction of the installation guide convex strip (130) is parallel to the optical axis of the imaging assembly (300), and the installation guide convex strip (130) is configured to be received in a guide slot on the lamp bracket.

14. The illumination and projection apparatus according to claim 5, wherein the illumination assembly (200) comprises a fourth lens (2101) and a fifth lens (2102), the fourth lens (2101) and the fifth lens (2102) are distributed in sequence from an image side to an object side along an optical axis, an object side surface of the fourth lens (2101) is a plane at the optical axis, an image side surface of the fourth lens (2101) is a convex surface at the optical axis, an object side surface of the fifth lens (2102) is a plane at the optical axis, and an image side surface of the fifth lens (2102) is a convex surface at the optical axis.

15. A courtesy lamp, comprising the illumination and projection apparatus according to claim 5.

* * * * *